(12) United States Patent
Aota et al.

(10) Patent No.: US 8,353,533 B2
(45) Date of Patent: Jan. 15, 2013

(54) STEERING APPARATUS

(75) Inventors: Kenichi Aota, Nara (JP); Yoshiaki Takagi, Yokohama (JP); Akihisa Kawanabe, Yokohama (JP)

(73) Assignee: JTEKT Corporation, Osaka (JP)

( * ) Notice: Subject to any disclaimer, the term of this patent is extended or adjusted under 35 U.S.C. 154(b) by 124 days.

(21) Appl. No.: 13/057,071

(22) PCT Filed: Aug. 5, 2009

(86) PCT No.: PCT/JP2009/003748
§ 371 (c)(1),
(2), (4) Date: Mar. 17, 2011

(87) PCT Pub. No.: WO2010/016252
PCT Pub. Date: Feb. 11, 2010

(65) Prior Publication Data
US 2011/0163524 A1    Jul. 7, 2011

(30) Foreign Application Priority Data
Aug. 5, 2008   (JP) .................................. 2008-202198

(51) Int. Cl.
*B62D 1/16* (2006.01)
(52) U.S. Cl. ...................................................... 280/779
(58) Field of Classification Search .................. 280/775, 280/779, 780; 74/493
See application file for complete search history.

(56) References Cited

U.S. PATENT DOCUMENTS

| | | | | |
|---|---|---|---|---|
| 7,275,458 B2 * | 10/2007 | Kinme et al. | ................... | 74/493 |
| 2005/0016314 A1 | 1/2005 | Kinme et al. | | |
| 2006/0086559 A1 | 4/2006 | Segawa et al. | | |

FOREIGN PATENT DOCUMENTS

| | | |
|---|---|---|
| CN | 1766359 A | 5/2006 |
| JP | U-62-15082 | 1/1987 |
| JP | A-2000-95118 | 4/2000 |
| JP | A-2005-8022 | 1/2005 |
| JP | 2005067340 A * | 3/2005 |
| JP | A-2007-203880 | 8/2007 |
| JP | A-2008-149955 | 7/2008 |
| JP | A-2008-155803 | 7/2008 |
| JP | A-2008-207612 | 9/2008 |
| JP | A-2008-222050 | 9/2008 |

OTHER PUBLICATIONS

International Search Report mailed Oct. 20, 2009 issued in International Patent Application No. PCT/JP2009/003748 (with translation).

* cited by examiner

*Primary Examiner* — Faye M. Fleming
(74) *Attorney, Agent, or Firm* — Oliff & Berridge, PLC

(57) ABSTRACT

A steering apparatus having a stationary bracket fixed to a vehicle body including a pair of first side plates; a receiving portion provided on the steering column for receiving one end of a conductive member; a pair of second side plates; a conductive cylindrical shaft secured between the pair of first side plates and inserted through the pair of the second side plates; and a plate-shaped conductive member interposed between the receiving portion and an outer peripheral surface of the cylindrical shaft. The conductive member includes first and second bow springs that fit the cylindrical shaft resiliently. The first bow spring is interposed between the second bow spring and the receiving portion, a first contact portion of the second bow spring is pressed to the outer peripheral surface of the cylindrical shaft, and a second contact portion of the first bow spring is pressed to the receiving portion.

10 Claims, 13 Drawing Sheets

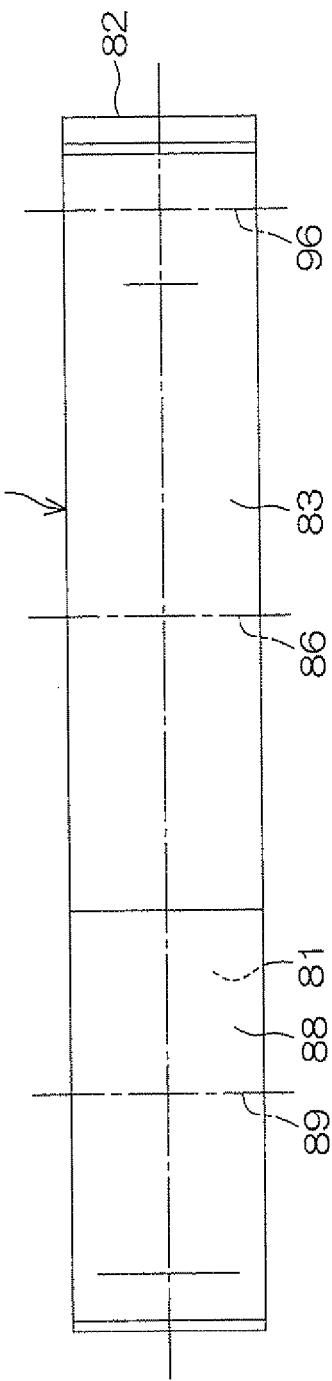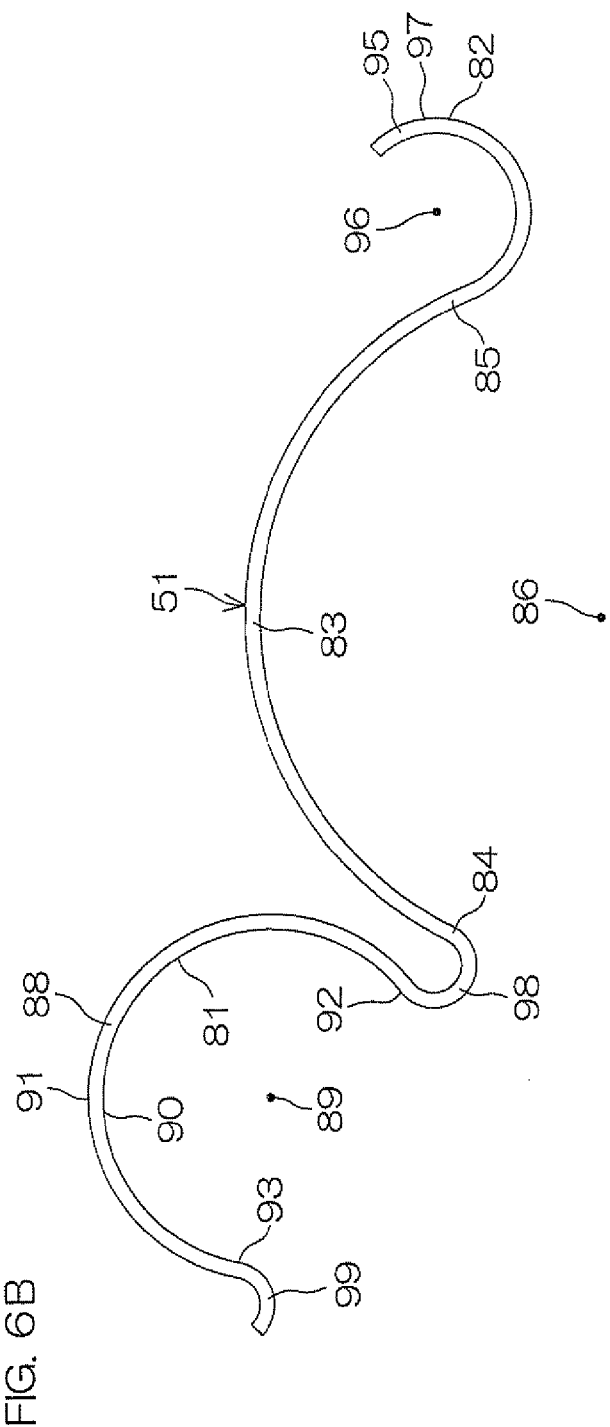
FIG. 6A
FIG. 6B

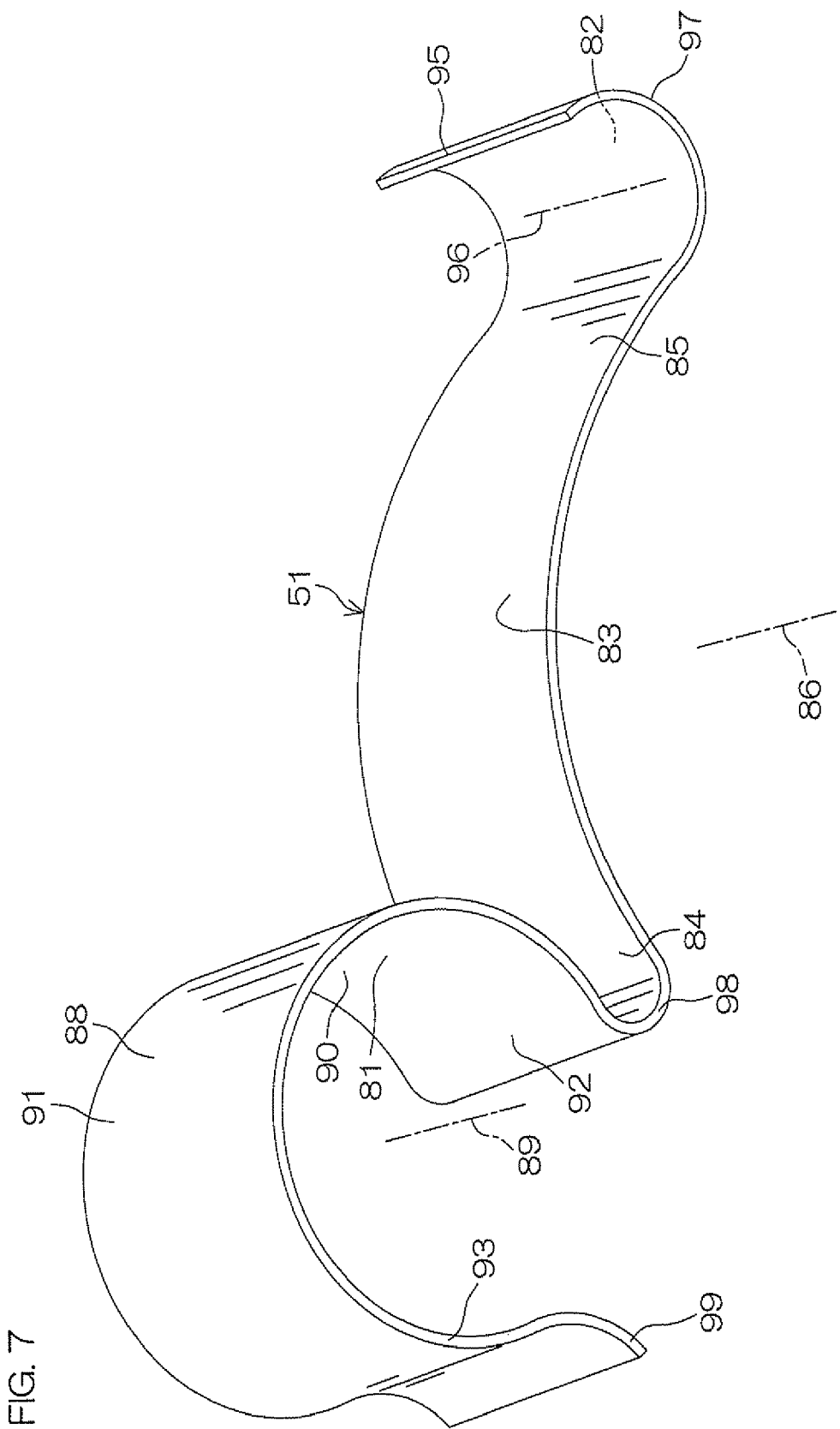

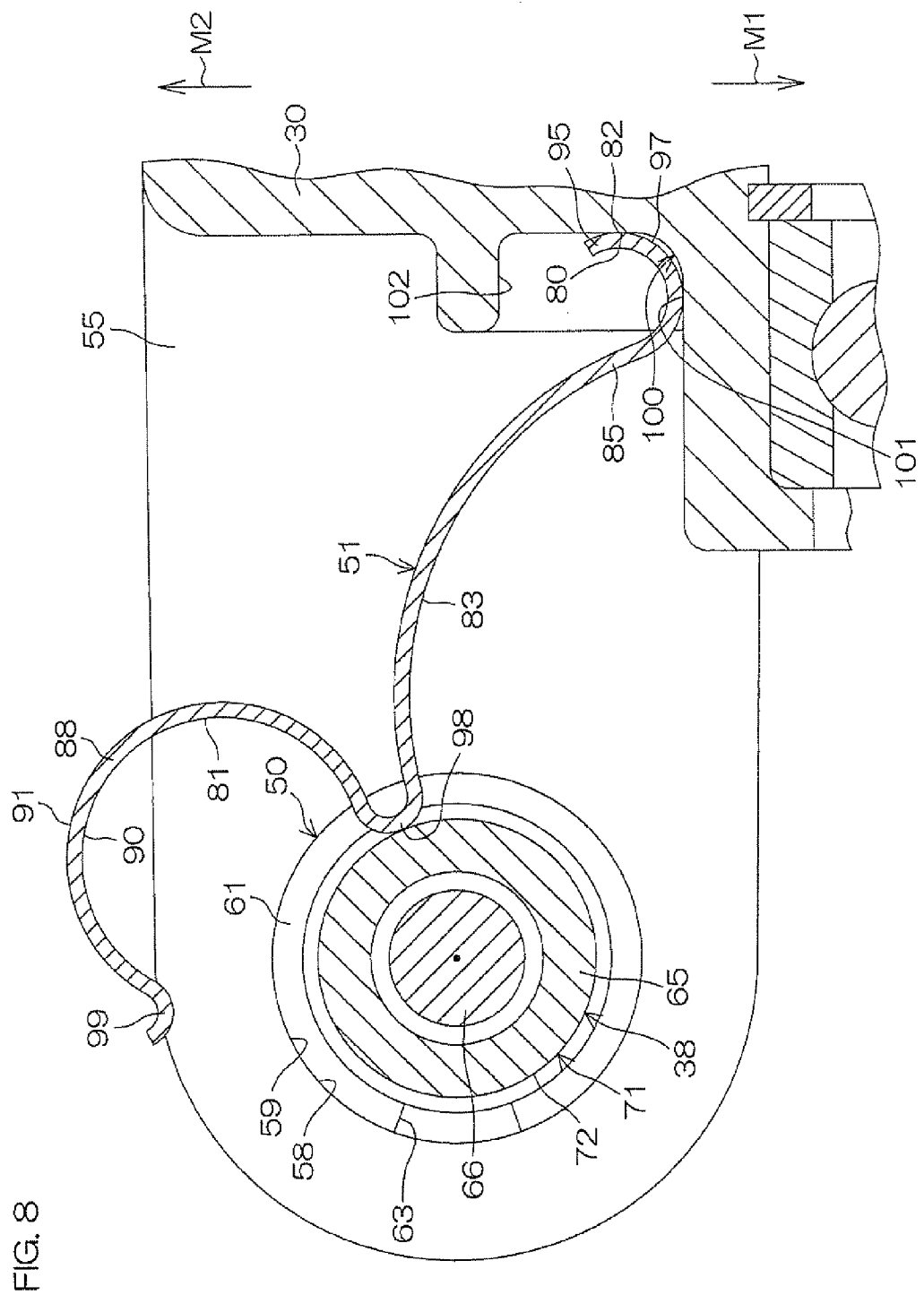

STEERING APPARATUS

TECHNICAL FIELD

The present invention relates to a steering apparatus.

Background Art

In order to ground an electric device such as a horn provided in a steering column, a steering apparatus includes a conductive member for electrically connecting the steering column to a stationary bracket on a vehicle body side (for example, refer to Patent Document 1).

The conductive member of Patent Document 1 has a plate shape, and has an insertion hole. A tilt bolt is inserted for joining the steering column and the stationary bracket.

PRIOR ART DOCUMENT

Patent Document 1; Japanese Unexamined Patent Publication No. 2005-8022A

SUMMARY OF THE INVENTION

Problem to be Solved by the Invention

However, to fit the conductive member of Patent Document 1, when assembling the steering apparatus, the tilt bolt must be inserted through the insertion hole of the conductive member in a state where the steering column, the stationary bracket, the tilt bolt, and the conductive member are aligned with each other. As a result, assembly of the steering apparatus is troublesome.

Further, the conductive member is required to make reliable conduction between the steering column and the stationary bracket.

Therefore, an object of the present invention is to provide a steering apparatus that can make reliable conduction between the steering column and the stationary bracket and reduce troubles when assembling the steering apparatus.

Means for Solving the Problem

Alphanumeric characters in parentheses shown below show reference numerals of corresponding components in preferred embodiments described later, however, the reference numerals are not intended to limit the scope of claims.

A steering apparatus (1) of the present invention includes a pair of first side plates (44, 45) provided on a stationary bracket (37) fixed to a vehicle body (39); first insertion holes (48) formed in the pair of first side plates (44, 45), respectively; a steering column (26) that supports rotatably a steering shaft (3) joined to a steering member (2); a receiving portion (80) that is provided on the steering column (26) for receiving one end of the conductive member (51); a pair of second side plates (54, 55) provided on both sides of the receiving portion (80) of the steering column (26); second insertion holes (58) formed in the pair of second side plates (54, 55), respectively; a conductive cylindrical shaft (65) inserted through the second insertion holes (58); a fastening shaft (66) that is inserted through the first insertion holes (48) and the cylindrical shaft (65) and fastens both end faces of the cylindrical shaft (65) to the sides of the first side plates (44, 45); and a plate-shaped conductive member (51) interposed between the receiving portion (80) and an outer peripheral surface (71) of an intermediate portion (68) in the axial direction of the cylindrical shaft (65), wherein the conductive member (51) includes a gripping portion (88) that resiliently grips the cylindrical shaft (65), a second contact portion (82) provided on the side opposite to the gripping portion (88), and an energizing portion interposed between the gripping portion (88) and the receiving portion (80), the gripping portion (88) has a U shape that can fit the cylindrical shaft (65) from the side surface of the cylindrical shaft (65) along a radial direction (R1), the energizing portion resiliently presses the gripping portion (88) against the outer peripheral surface of the cylindrical shaft (65) via a first contact portion (81), and the second contact portion (82) provided on the energizing portion is resiliently pressed against the receiving portion (80).

According to the configuration of the present invention, the gripping portion (88) is in resilient contact with the outer surface of the cylindrical shaft (65) via the first contact portion (81) while resiliently pressing the outer surface, so that the conductive member (51) and the cylindrical shaft (65) are resiliently conductive to each other. Further, the second contact portion (82) is in contact with the receiving portion (80) while being reliably pressed against the receiving portion (80), so that the conductive member (51) and the receiving portion (80) reliably become conductive to each other. As a result, the receiving portion (80) provided on the steering column (26) and the cylindrical shaft (65) reliably become conductive to each other. Eventually, the stationary bracket (37) and the steering column (26) can be made reliably electrically conductive.

Moreover, in a state where the fastening shaft (66) is inserted through the first insertion holes (48) of the pair of first side plates (44, 45) and the cylindrical shaft (65), the gripping portion (88) can be fitted to the cylindrical shaft (65). As a result, troubles in fitting of the conductive member (51) can be reduced.

Further, the gripping portion (88) resiliently grips the cylindrical shaft (65), and the energizing portion is interposed in a resiliently compressed state between the outer peripheral surface of the cylindrical shaft (65) and the receiving portion (80). Accordingly, the conductive member (51) can be held between the outer peripheral surface of the cylindrical shaft (65) and the receiving portion (80). Therefore, a conventional attaching member such as a bolt that is conventionally used to attach the conductive member can be simplified, and further, the conventional attaching member can be omitted.

In the present invention, a structure can also be adopted in which the conductive member (51) includes a first bow spring (83) forming the energizing portion and a second bow spring (88) that is connected to the first bow spring (83) and forms the first contact portion (81), and the first contact portion (81) is formed on the inner peripheral surface of the second bow spring (88). In this case, for example, when the first bow spring (83) is resiliently deformed to reduce the radius of curvature of the curve of the first bow spring (83), the first bow spring (83) can be interposed in a resiliently compressed state between the receiving portion (80) and the cylindrical shaft (65). When the second bow spring (88B) is resiliently deformed to increase the radius of curvature of the curve of the second bow spring (88B), the second bow spring (88B) can be fitted to the cylindrical shaft (65) and can resiliently constrict the cylindrical shaft (65). Accordingly, the second bow spring (88B) is reliably held by the cylindrical shaft (65).

In the present invention, it is preferable that the first bow spring (83) and the second bow spring (88B) have centers of curvature (86 and 89) on the same side. In this case, when the second bow spring (88B) is attached to the cylindrical shaft (65) from the radially outer side of the steering column (26), the first bow spring (83) is prevented from easily interfering with the steering column (26).

In the present invention, it is preferable that on the outer peripheral surface of the cylindrical shaft (65), a groove (72; 72D) extending along at least a part of the circumferential direction (T1) of the cylindrical shaft (65) is formed, the second bow spring (88B) is fitted in the groove (72; 72D) and restricted from moving in the axial direction of the cylindrical shaft (65) by the groove (72; 72D). In this case, relative movement of the cylindrical shaft (65) and the second bow spring (88B) in the axial direction of the cylindrical shaft (65) can be restricted, so that a contact failure can be prevented from occurring between the cylindrical shaft (65) and the first contact portion (81).

In the present invention, the depth (L3) of the groove (72D) may be gradually increased toward the central portion (154) of the groove (72D) in the axial direction of the cylindrical shaft (65). In this case, the groove (72D) can be easily formed by plastic forming. As a result, the manufacturing cost can be further reduced. For example, in a section of the groove (72D), a groove bottom portion provided at the central portion is curved like a recess, and a pair of edge portions of the grooves (72D) are curved like projections. This is suitable for forming the groove by forging.

In the present invention, it is allowed that on the second end portion (85) of the first bow spring (83) as the energizing portion, a third bow spring (95) is provided, and the second contact portion (82) is formed on the outer peripheral surface (97) of the third bow spring (95). In this case, by a resilient energizing force of the third bow spring (95), the second contact portion (82) can be reliably brought into contact with the receiving portion (80).

It is preferable that the first bow spring (83) and the third bow spring (95) are curved opposite to each other.

In the present invention, it is preferable that the steering column (26) is provided with a restricting portion (100) that restricts the second contact portion (82) from moving with respect to the steering column (26). In this case, relative movement of the receiving portion (80) and the second contact portion (82) can be restricted, so that a contact failure can be prevented from occurring between the receiving portion (80) and the second contact portion (82). The restricting portion (100) and the gripping portion (88) are provided, so that the conductive member (51) can be more reliably held on the receiving portion (80) and the cylindrical shaft (65). As a result, the conventional attaching member can be omitted.

In the present invention, it is preferable that the second contact portion (82) is received by the receiving portion (80) and the restricting portion (100). In this case, the receiving portion (80) and the second contact portion (82) can be more reliably prevented from moving relative to each other.

In the present invention, a structure can also be adopted in which insulating members (50) interposed between the inner peripheral surfaces (59) of the second insertion holes (58) and the outer peripheral surfaces (69) of the end portions (67) in the axial direction (X1) of the cylindrical shaft (65) are further provided, and the cylindrical shaft (65) supports the pair of second side plates (54, 55) via the insulating members (50). Thus, conduction between the cylindrical shaft (65) and the steering column (26) is secured even via the insulating members (50), so that the steering column (26) can be reliably grounded.

The above-described or any other advantages, features, and effects of the present invention will be clarified from the following description of embodiments with reference to the accompanying drawings.

BRIEF DESCRIPTION OF THE DRAWINGS

FIG. 6A is a plan view of a conductive member shown in FIG. 2.

FIG. 6B is a side view of the conductive member of FIG. 6A.

FIG. 7 is a perspective view of the conductive member of FIG. 6A.

FIG. 8 is a sectional view showing a state during installation of the conductive member of FIG. 6A into the steering apparatus.

BEST MODE FOR CARRYING OUT THE INVENTION

The present embodiments will be described based on a case where a steering apparatus is an electric power steering system (EPS). The present invention is not limited to this, and the steering apparatus may be a manual steering apparatus that does not obtain a steering assist force.

Figure 1:
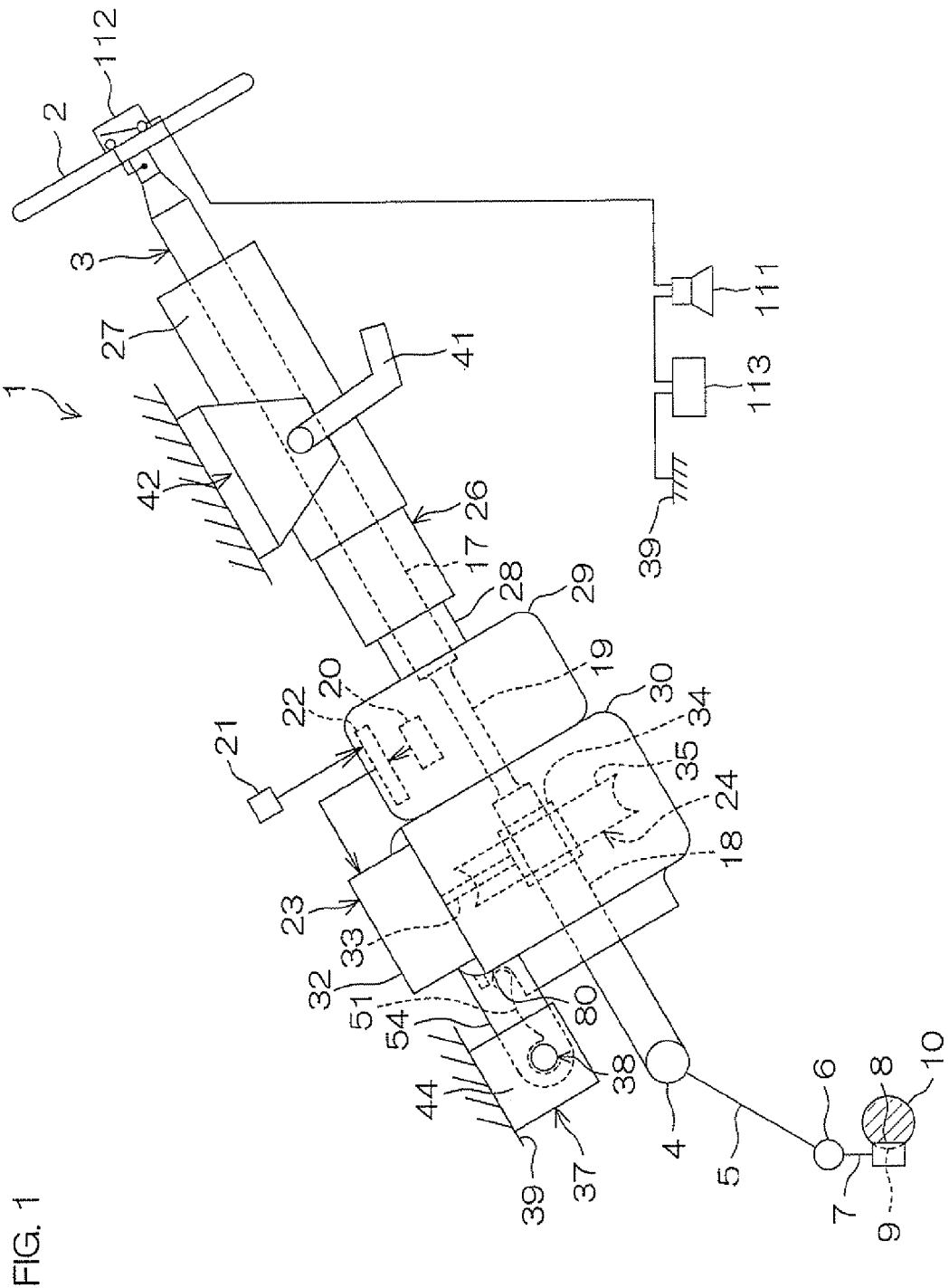
FIG. 1 is a schematic view showing a general configuration of a steering apparatus according to a first embodiment of the present invention.

FIG. 1 is a schematic view of a general configuration of a steering apparatus of a first embodiment of the present invention.

A steering apparatus 1 includes a steering shaft 3 joined to a steering member 2 such as a steering wheel, an intermediate shaft 5 joined to the steering shaft 3 via a first universal joint 4, a pinion shaft 7 joined to the intermediate shaft 5 via a second universal joint 6, and a rack bar 10 as a steered shaft that has a rack gear 9 to engage with a pinion gear 8 provided near an end portion of the pinion shaft 7 and extends in the right-left direction (equivalent to the direction vertical to the figure sheet of FIG. 1) of a vehicle.

The pinion shaft 7 and the rack bar 10 constitute a steering gear including a rack-and-pinion mechanism. The rack bar 10 is supported so as to reciprocate linearly via a plurality of bearings inside a rack housing to be fixed to a vehicle body. To the rack bar 10, a pair of tie rods (not shown) are coupled. Each tie rod is joined to a corresponding steered wheel (not shown) via a corresponding knuckle arm (not shown).

When the steering member 2 is operated and the steering shaft 3 is rotated, this rotation is converted into linear movement of the rack bar 10 along the right-left direction of the vehicle by the pinion gear 8 and the rack gear 9. Accordingly, the steered wheels are turned.

The steering shaft 3 is divided into an input shaft 17 connected to the steering member 2 and an output shaft 18 connected to the pinion shaft 7. These input shaft 17 and output shaft 18 are joined to each other on the same axis line via a torsion bar 19. When a steering torque is input into the input shaft 17, the torsion bar 19 is resiliently torsionally deformed, and accordingly, the input shaft 17 and the output shaft 18 rotate relative to each other.

A torque sensor 20 that detects the steering torque based on relative rotational displacement between the input shaft 17 and the output shaft 18 via the torsion bar 19 is provided. Further, a vehicle speed sensor 21 for detecting a vehicle speed is provided. An ECU (Electronic Control Unit) 22 as a control device is also provided. An electric motor 23 for generating a steering assist force and a speed reduction mechanism 24 that decelerates the output rotation of the electric motor 23 are provided.

Detection signals from the torque sensor 20 and the vehicle speed sensor 21 are input into the ECU 22. The ECU 22 controls the steering assist electric motor 23 based on the torque detection result and the vehicle detection result. The output rotation of the electric motor 23 is decelerated via the speed reduction mechanism 24 and transmitted to the pinion shaft 7 and converted into linear movement of the rack bar 10, and accordingly, steering is assisted.

The steering apparatus 1 further includes a steering column 26 that supports the steering shaft 3 rotatably.

The steering column 26 includes an upper tube 27, a lower tube 28 fitted to the upper tube 27, a sensor housing 29 provided integrally with the lower tube 28, and a gear housing 30 provided integrally with the sensor housing 29. The upper tube 27, the lower tube 28, the sensor housing 29, and the gear housing 30 are made of a metal as a conductor, and are electrically connected to each other.

The sensor housing 29 houses and holds the torque sensor 20 and the ECU 22. To the gear housing 30, the motor housing 32 of the electric motor 23 is fixed. The motor housing 32 is made of a metal as a conductor, and electrically connected to the gear housing 30. The gear housing 30 houses the speed reduction mechanism 24. The speed reduction mechanism 24 includes a drive gear 34 to be driven by the output shaft 33 of the electric motor 23 and a driven gear 35 that engages with the drive gear 34. The driven gear 35 is fixed to the output shaft 18 so as to rotate integrally with the output shaft 18 of the steering shaft 3.

The steering apparatus 1 includes a stationary bracket 37 as a vehicle body side member that supports the lower portion of the steering column 26, and a pivot member 38 for supporting the lower portion of the steering column 26 turnably. The pivot member 38 is fixed to the stationary bracket 37. The stationary bracket 37 and the pivot member 38 are made of a metal as a conductor, and are electrically connected to each other. The stationary bracket 37 is fixed to the vehicle body 39, and electrically connected to the vehicle body 39.

The steering column 26 includes, for example, the lower tube 28, the sensor housing 29, and the gear housing 30 at a lower portion thereof. The lower portion of the steering column 26 is supported on the vehicle body 39 via the stationary bracket 37, and supported turnably by a tilt hinge mechanism including the pivot member 38. By swinging the entire steering column 26 around the pivot member 38 together with the steering member 2, the height position of the steering member 2 is adjusted.

On the other hand, in connection with the upper tube 27 of the steering column 26, a support mechanism 42 that supports the upper portion of the steering column 26 is provided. The support mechanism 42 can switch the position of the steering column 26 between a locked state and an unlocked state by an operation of an operation lever 41.

Figure 2:
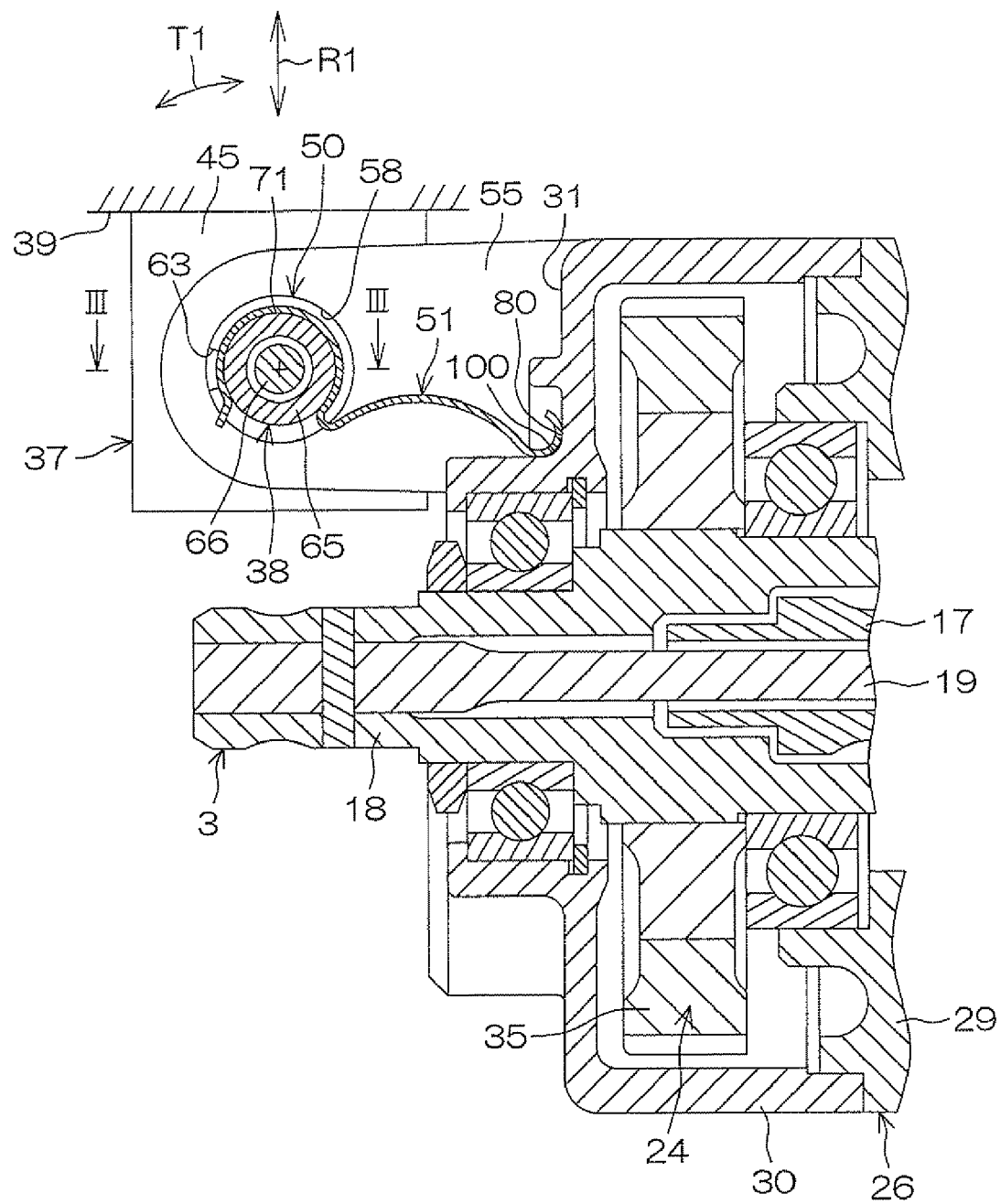
FIG. 2 is an essential part sectional view of the steering apparatus of FIG. 1.
Figure 3:
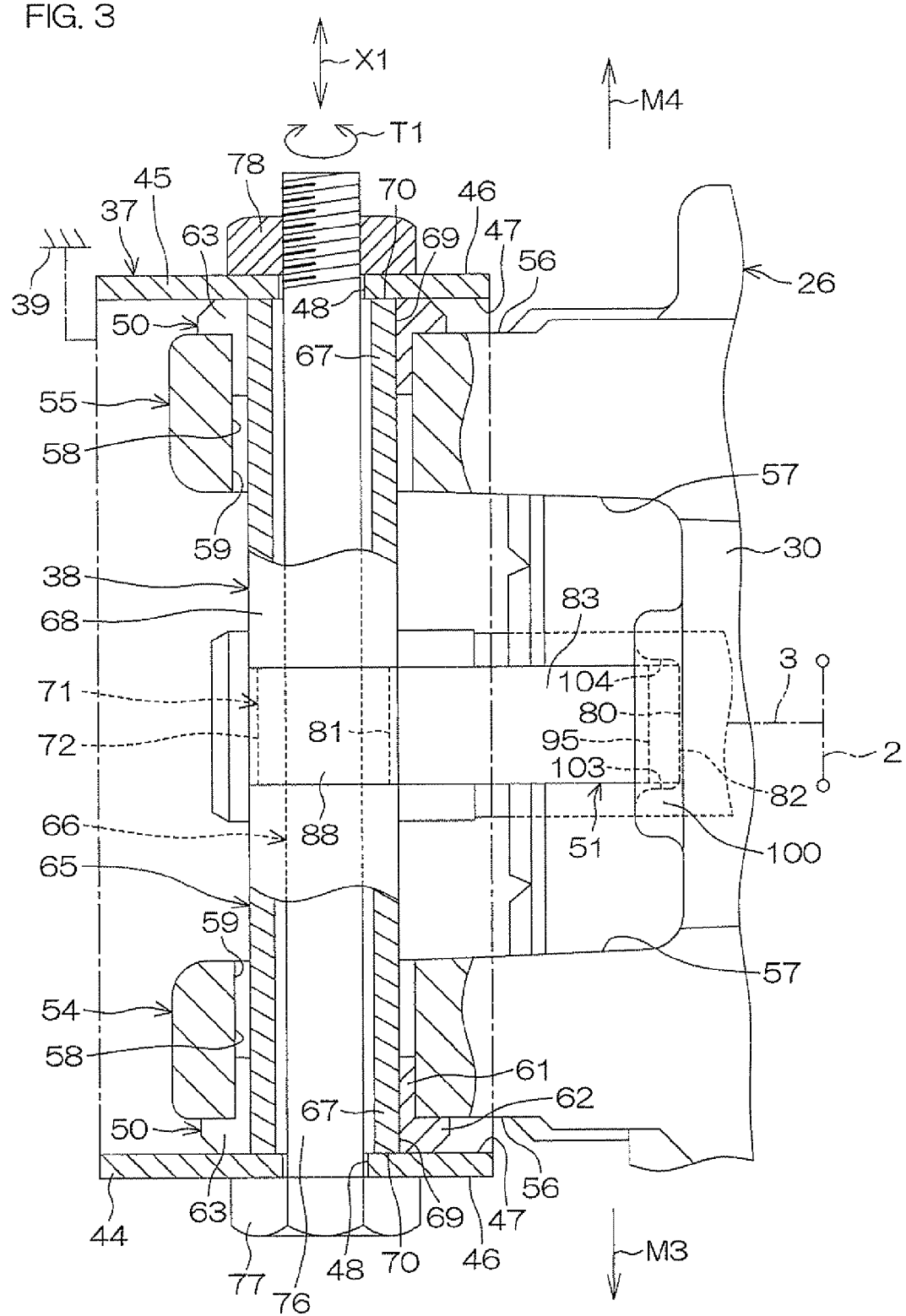
FIG. 3 is a plan view of FIG. 2, partially shown in a section.

FIG. 2 is a sectional view of an essential part of the steering apparatus 1 of FIG. 1. FIG. 3 is a plan view of FIG. 2, partially showing a section along The stationary bracket 37 includes a pair of first side plates 44 and 45 facing each other in the right-left direction of the vehicle (equivalent to the direction vertical to the figure sheet of FIG. 2, and equivalent to the figure sheet up-down direction of FIG. 3). Each of the pair of first side plates 44 and 45 has an outer side surface 46 and an inner side surface 47. First insertion holes 48 are formed in the pair of first side plates 44 and 45, respectively. The stationary bracket 37 may be formed integrally with a part of the vehicle body 39, and the stationary bracket 37 is accordingly fixed to the vehicle body 39. Alternatively, the stationary bracket 37 may be formed separately from the vehicle body 39, and attached to the vehicle body 39 in a fixed manner.

Figure 4:
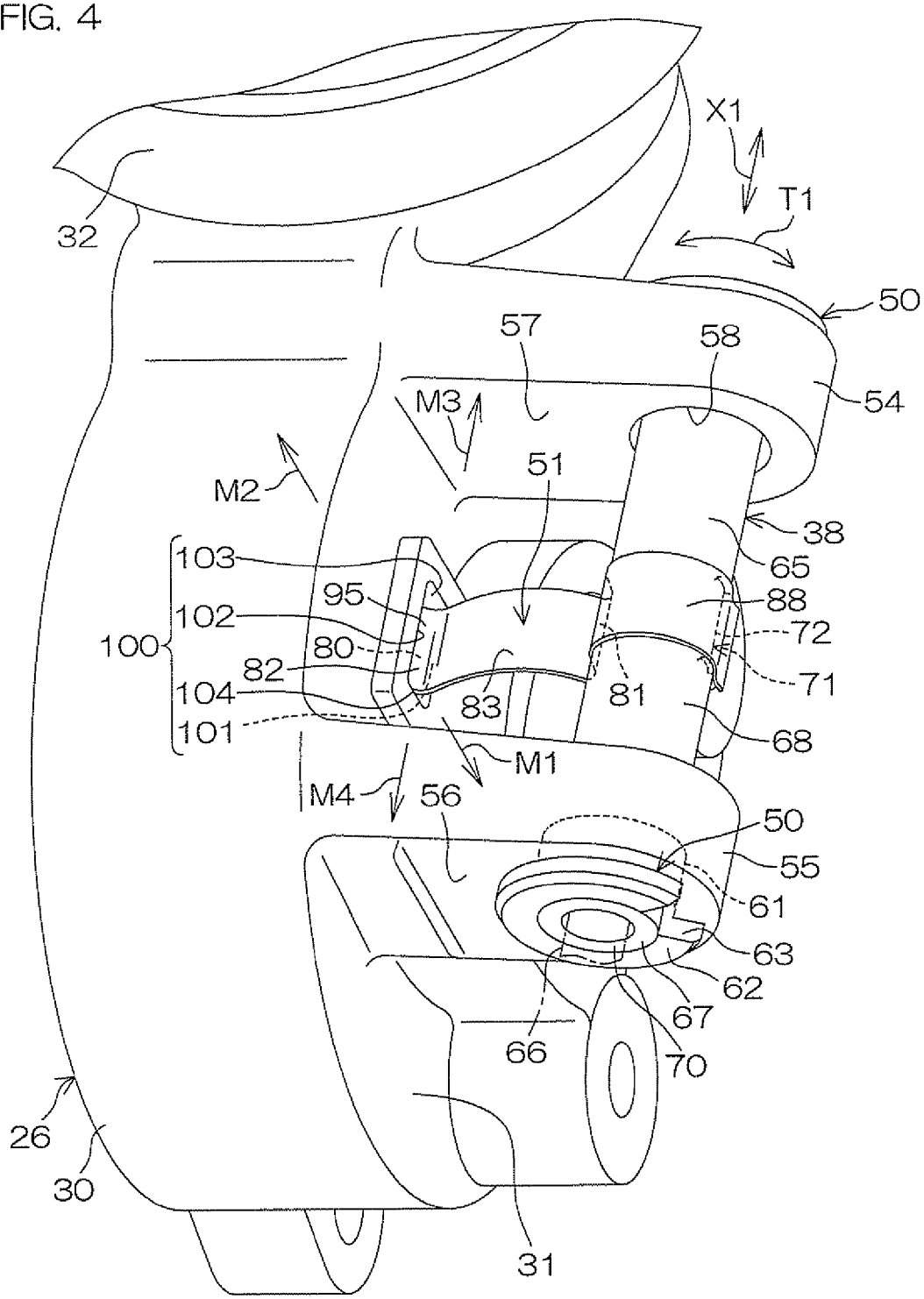
FIG. 4 is a perspective view of FIG. 2.

FIG. 4 is a perspective view of the essential part of FIG. 2. In FIG. 4, the stationary bracket 37 is not shown. Referring to FIG. 3 and FIG. 4, the tilt hinge mechanism includes the pivot member 38, a pair of bushings 50 as insulating members described later, a conductive member 51 described later, and a pair of side plates 54 and 55 provided on the lower portion of the steering column 26. At least one conductive member 51 may be provided. In the present invention, description is given by assuming that one conductive member 51 is provided.

The lower portion of the steering column 26 includes a pair of second side plates 54 and 55 facing each other in the right-left direction of the vehicle. The pair of second side plates 54 and 55 and the bottom portion 31 of the gear housing 30 are formed integrally from a single member. Each of the pair of second side plates 54 and 55 has an outer side surface 56 and an inner side surface 57. The outer side surfaces 56 of the second side plates 54 and 55 are opposed to the inner side surfaces 47 of the pair of first side plates 44 and 45 of the stationary bracket 37.

In the pair of second side plates 54 and 55, second insertion holes 58 are formed, respectively. To the inner peripheral surfaces 59 of the second insertion holes 58 of the pair of second side plates 54 and 55, insulating bushings 50 made of a synthetic resin are fitted, respectively.

Each bushing 50 is made of a synthetic resin member as a low-friction member. Each bushing 50 includes a cylindrical main body 61 fitted to the second insertion hole 58, and an annular flange 62 extended radially on one end portion of the main body 61. The flange 62 of one of the bushings 50 is interposed between the first side plate 44 of the stationary bracket 37 and the second side plate 54 of the steering column 26 facing each other. The flange 62 of the other bushing 50 is interposed between the first side plate 45 of the stationary bracket 37 and the second side plate 55 of the steering column 26 facing each other. In the bushings 50, slits 63 extending in the axial direction are formed, and accordingly, the bushings 50 have ends in the circumferential direction. The main bodies 61 of the bushings 50 are fitted in the second insertion holes 58 in a resiliently diameter-reduced state.

Figure 5:
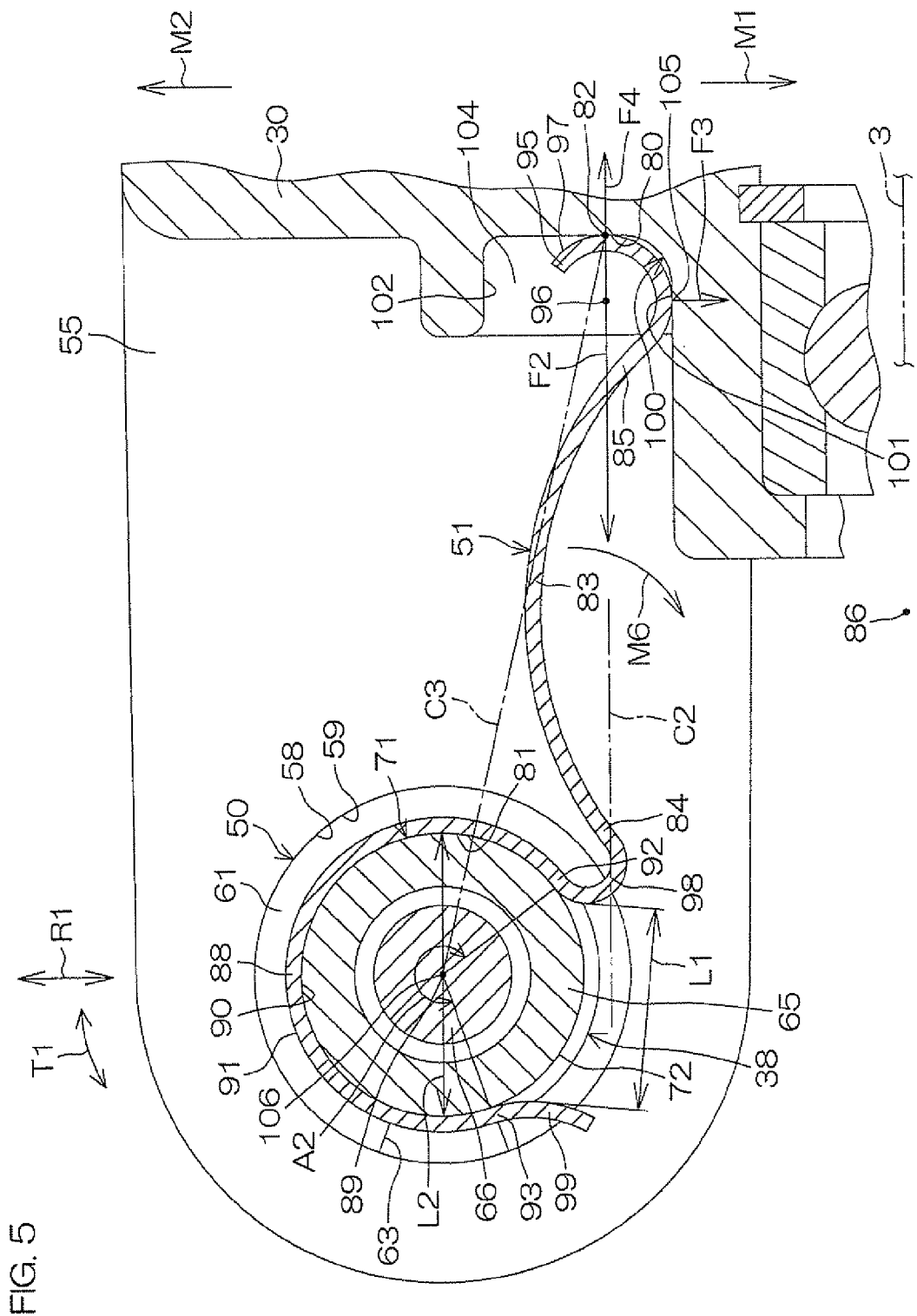
FIG. 5 is an enlarged view of an essential part of FIG. 2.

FIG. 5 is an enlarged view of the essential part of FIG. 2. Referring to FIG. 3 and FIG. 5, the pivot member 38 includes a conductive cylindrical shaft 65 inserted through the pair of bushings 50, and a bolt 66 as a fastening shaft inserted through the cylindrical shaft 65. The cylindrical shaft 65 is inserted through the second insertion holes 58 of the pair of second side plates 54 and 55. The cylindrical shaft 65 is sandwiched between the pair of first side plates 44 and 45 of the stationary bracket 37. The bolt 66 is inserted through the first insertion holes 48 of the pair of first side plates 44 and 45 and the cylindrical shaft 65.

Referring to FIG. 3, the cylindrical shaft 65 supports the pair of second side plates 54 and 55 via the bushings 50. The axial direction X1 of the cylindrical shaft 65 and the right-left direction of the vehicle are parallel to each other. The cylindrical shaft 65 has a pair of end portions 67 and an intermediate portion 68 between the end portions 67 in the axial direction X1 of the cylindrical shaft 65. Each end portion 67 has an outer peripheral surface 69 and an end face 70. The intermediate portion 68 has an outer peripheral surface 71. On the outer peripheral surface 71 of the intermediate portion 68, a groove 72 as a recess is formed. This groove 72 extends endlessly in the circumferential direction T1 of the cylindrical shaft 65. The groove 72 has a groove bottom that is formed to have a cylindrical surface shape and a pair of side walls facing each other in the axial direction X1 of the cylindrical shaft 65.

As a method for manufacturing the cylindrical shaft 65, it is possible to form the groove 72 by cutting on the outer periphery of a tube as a material. As another manufacturing method, the following method is also possible. That joins, a first tube as a material with a small outer diameter and a pair of second tubes as materials with large outer diameters to each other. The pair of second tubes are pressure-welded (pressure contact) to both end portions in the axial direction of the first tube.

The bolt 66 includes a threaded shaft 76 and a head portion 77. On one end in the axial direction of the threaded shaft 76, a male thread as a threaded portion is formed. The threaded shaft 76 is inserted through the cylindrical shaft 65 and the first insertion holes 48 of the pair of first side plates 44 and 45 of the stationary bracket 37. On the other end in the axial direction of the threaded shaft 76, the head portion 77 is formed integrally.

A nut 78 as an end member is screwed and fitted to the male thread of the threaded shaft 76. The head portion 77 of the bolt 66 is in contact with the outer side surface 46 of one side plate 44 of the stationary bracket 37, and the nut 78 is in contact with the outer side surface 46 of the other first side plate 45 of the stationary bracket 37.

By screwing the fixation bolt 66 into the nut 78, the cylindrical shaft 65 of the pivot member 38 can be secured between the pair of first side plates 44 and 45 of the stationary bracket 37. Accordingly, the cylindrical shaft 65 is fastened to the stationary bracket 37. End faces 70 of the pair of end portions 67 of the cylindrical shaft 65 are brought into pressure contact with the inner side surfaces 47 of the corresponding first side plates 44 and 45 of the stationary bracket 37. As a result, electric conduction between the stationary bracket 37 as a vehicle side member and the cylindrical shaft 65 is made possible.

On the other hand, between the cylindrical shaft 65 and one second side plate 54 of the steering column 26, the insulating bushing 50 is interposed. Similarly, between the cylindrical shaft 65 and the other second side plate 55, the insulating bushing 50 is interposed. As a result, electric conduction is blocked between the inner peripheral surfaces 59 of the second insertion holes 58 of the second side plates 54 and 55 of the steering column 26 and the outer peripheral surfaces 69 of the end portions 67 in the axial direction X1 of the cylindrical shaft 65.

Therefore, in the present embodiment, a conductive member 51 that electrically connects the cylindrical shaft 65 and the steering column 26 is provided. The lower portion of the steering column 26 has a receiving portion 80 that receives the conductive member 51.

Referring to FIG. 2 and FIG. 3, the receiving portion 80 is made of a metal as a conductor, and disposed between the pair of second side plates 54 and 55. The receiving portion 80 assumes a plane crossing the axial direction of the steering shaft 3 and parallel to the axial direction X1 of the cylindrical shaft 65. The receiving portion 80 is fixed to the bottom portion 31 of the gear housing 30, and electrically connected to the gear housing 30. In the present embodiment, the receiving portion 80 is formed from a single member integrally with the bottom portion 31 of the gear housing 30.

The conductive member 51 is interposed between the receiving portion 80 and the outer peripheral surface 71 of the intermediate portion 68 of the cylindrical shaft 65. The conductive member 51 is made of a resilient metal material such as iron, copper, brass, phosphor bronze, or stainless steel, and has a plate shape. By bringing the conductive member 51 into contact with the receiving portion 80, the conductive member 51 and the receiving portion 80 are electrically connected to each other. Accordingly, the conductive member 51 is electrically connected to the gear housing 30 via the receiving portion 80.

FIG. 6A is a plan view of the conductive member 51 of FIG. 2, showing a free state without resilient deformation. FIG. 6B is a side view of the conductive member 51 of FIG. 6A. FIG. 7 is a perspective view of the conductive member 51 of FIG. 6A in the free state.

Referring to FIG. 5 and FIG. 7, the conductive member 51 includes a first contact portion 81 that comes into contact with the outer peripheral surface 71 of the cylindrical shaft 65, a second contact portion 82 in contact with the receiving portion 80, and a first bow spring 83 as an energizing portion interposed between the first and second contact portions 81 and 82.

By the first bow spring 83, the first contact portion 81 is resiliently pressed against the outer peripheral surface 71 of the cylindrical shaft 65. Along with this, the second contact portion 82 is resiliently pressed against the receiving portion 80 by the first bow spring 83. The first contact portion 81 presses the cylindrical shaft 65 toward the center of the cylindrical shaft 65. The second contact portion 82 presses the receiving portion 80 in a direction away from the center of the cylindrical shaft 65.

The conductive member 51 is attached in a resiliently deformed state to the cylindrical shaft 65 and the receiving portion 80. Hereinafter, a state where the conductive member 51 is attached while being resiliently deformed will be described if not otherwise specified.

The first bow spring 83 is a leaf spring having a curved shape. The first bow spring 83 has a first end portion 84 and a second end portion 85 in the direction along the curve. The first bow spring 83 has a center of curvature 86 of the curve. The position of this center of curvature 86 differs between the state where the conductive member 51 is installed and the free state.

When the conductive member 51 is installed in the steering apparatus 1, the first bow spring 83 is resiliently deformed to bend. Accordingly, the radius of curvature of the curve of the first bow spring 83 in the installed state is smaller than that of the first bow spring 83 in the free state. As a result, a resilient restoring force that makes the first and second end portions 84 and 85 move away from each other is generated.

To the first end portion 84 of the first bow spring 83, the second bow spring 88 is connected. On the second end portion 85 of the first bow spring 83, the third bow spring 95 described later is provided.

The second bow spring 88 has a curved shape, for example, an arc shape as viewed along the axial direction X1 (equivalent to the direction vertical to the figure sheet of FIG. 5) of the cylindrical shaft 65. The second bow spring 88 has a center of curvature 89 of the curve, an inner peripheral surface 90, and an outer peripheral surface 91. The second bow spring 88 has a pair of end portions 92 and 93 in the direction along the curve of the second bow spring 88 (equivalent to the circumferential direction T1 of the cylindrical shaft 65). The position of the center of curvature 89 of the curve of the second bow spring 88 differs between the state where the conductive member 51 is installed and the free state.

The first bow spring 83 and the second bow spring 88 have centers of curvature 86 and 89 on the same side with respect to the conductive member 51 in the installed state. As viewed along the axial direction X1 of the cylindrical shaft 65, the first bow spring 83 and the second bow spring 88 assume substantially the shape of "3."

The inner peripheral surface 90 of the second bow spring 88 is along the outer peripheral surface 71 of the cylindrical shaft 65. On the inner peripheral surface 90 of the second bow spring 88, the first contact portion 81 is formed. The central angle A2 of the first contact portion 81 is larger than 180° (A2>180°).

The second bow spring 88 has a substantially U or C shape. Accordingly, the second bow spring 88 can be fitted to the cylindrical shaft 65 from the radial direction R1 of the cylindrical shaft 65.

The second bow spring 88 functions as a gripping portion that resiliently grips the cylindrical shaft 65. The second bow spring 88 is attached in a resiliently diameter-expanded state to the cylindrical shaft 65, and can resiliently constrict the outer peripheral surface 71 of the cylindrical shaft 65.

Referring to FIG. 3 and FIG. 5, the second bow spring 88 is fitted in the groove 72 as a restricting portion of the outer peripheral surface 71 of the cylindrical shaft 65. With the groove 72, the first contact portion 81 is restricted from moving to both sides in the axial direction X1 of the cylindrical shaft 65. In the axial direction X1 of the cylindrical shaft 65, the groove width of the groove 72 is set to be equal to or slightly larger than the width of the second bow spring 88.

Referring to FIG. 5 and FIG. 7, the third bow spring 95 is a curved leaf spring. The outer peripheral surface of the third bow spring 95 is designated by the reference numeral "97," and the center of curvature of the curve is designated by the reference numeral "96." In the installed state, the first bow spring 83 and the third bow spring 95 are curved opposite to each other. "Curved opposite to each other" means a state where the centers of curvature are on the sides opposite to each other (surface side and back side) with respect to the leaf-spring-like conductive member 51. "Curved in the same direction" means a state where the centers of curvature are on the same side with respect to the leaf spring. On the outer peripheral surface 97 of the third bow spring 95, the second contact portion 82 is formed. The position of the center of curvature 96 of the curve of the third bow spring 95 slightly differs between the state where the conductive member 51 is installed and the free state.

One end portion 92 of the second bow spring 88 and the first end portion 84 of the first bow spring 83 are connected via a fourth bow spring 98. To the other end portion 93 of the second bow spring 88, a fifth bow spring 99 is connected.

The second bow spring 88, the fourth bow spring 98, and the fifth bow spring 99 assume a shape of substantially "Ω" (ohm) as viewed along the axial direction X1 of the cylindrical shaft 65. The fourth bow spring 98 is curved opposite to the curve of the second bow spring 88, and the fifth bow spring 99 is curved opposite to the curve of the second bow spring 88. Therefore, the fourth bow spring 98 and the fifth bow spring 99 are curved to the same side. The radius of curvature of the curve of the fourth bow spring 98 is smaller than that of the second bow spring 88. The radius of curvature of the curve of the fifth bow spring 99 is smaller than that of the second bow spring 88.

The fourth bow spring 98 and the fifth bow spring 99 are spaced from each other. A minimum distance L1 between the fourth bow spring 98 and the fifth bow spring 99 is made smaller than the diameter L2 of the outer peripheral surface 71 of the intermediate portion 68 of the cylindrical shaft 65 (L1<L2). This diameter L2 is an outer diameter of a portion forming the groove bottom of the groove 72 of the outer peripheral surface 71.

In the free state without resilient deformation, the conductive member 51 has substantially the same shape as in the state where it is attached to the cylindrical shaft 65 and the receiving portion 80. Specifically, the first, second, third, fourth and fifth bow springs 83, 88, 95, 98, and 99 are curved leaf springs.

Referring now to FIG. 6A, FIG. 6B, and FIG. 7, in the free state, the first bow spring 83 and the second bow spring 88 have centers of curvature 86 and 89 on the same side with respect to the conductive member 51. In the free state, the first bow spring 83 and the third bow spring 95 have centers of curvature 86 and 96 on the sides opposite to each other with respect to the conductive member 51.

Referring to FIG. 6A and FIG. 6B, the conductive members 51 are formed of corrugated leaf springs, and their plate surfaces are continuously and smoothly connected to each other. The first, second, third, fourth and fifth bow springs 83, 88, 95, 98, and 99 are formed of a single material integrally. The plate thicknesses of the first, second, third, fourth, and fifth bow springs 83, 88, 95, 98, and 99 are equal to each other. The plate widths (equivalent to dimensions in the axial direction X1 of the cylindrical shaft 65) of the first, second, third, fourth, and fifth bow springs 83, 88, 95, 98, and 99 are equal to each other.

Referring to FIG. 4 and FIG. 5, the steering column 26 includes a holding wall 100 as a restricting portion that restricts the second contact portion 82 of the conductive member 51 from moving with respect to the steering column 26.

The holding wall 100 is formed to be erect from the peripheral edge of the receiving portion 80. The holding wall 100 is fixed to the bottom portion 31 of the gear housing 30. The holding wall 100 is disposed in a quadrilateral annular shape surrounding the receiving portion 80. Accordingly, the holding wall 100 can restrict the second contact portion 82 from moving in the directions M1, M2, M3, and M4 along the receiving portion 80.

The third bow spring 95 is received in the quadrilateral annular shape of the holding wall 100. Accordingly, the conductive member 51 can be properly and reliably attached to the receiving portion 80. The received third bow spring 95 comes into contact with the receiving portion 80, and further comes into contact with a first portion 101 described later of the holding wall 100.

The holding wall 100 includes first, second, third, and fourth portions 101, 102, 103, and 104. The portions 101, 102, 103, and 104 form corresponding sides of the quadrilateral annular shape of the holding wall 100.

The first and second portions 101 and 102 are disposed to face each other across the receiving portion 80 in the first and second directions M1 and M2 along the receiving portion 80. The distance between the first and second portions 101 and 102 is set to be equal to or larger than the outer diameter of the curve of the third bow spring 95. In the present embodiment, description is given based on the case where the distance is larger than the outer diameter.

Referring to FIG. 3 and FIG. 4, the third and fourth portions 103 and 104 are disposed to face each other across the receiving portion 80 in the third and fourth directions M3 and M4 along the receiving portion 80. The distance between the third and fourth portions 103 and 104 is set to be equal to or larger than the plate width of the third bow spring 95 in the present embodiment, description is given based on the case where the distance is larger than the plate width.

Here, the third and fourth directions M3 and M4 along the receiving portion 80 are opposite to each other, and parallel to the axial direction X1 of the cylindrical shaft 65. The third and fourth directions M3 and M4 are orthogonal to the first and second directions M1 and M2. The first and second directions M1 and M2 are opposite to each other.

Referring to FIG. 5, the first portion 101 can restrict movement in the first direction M1 of the second contact portion 82. The movement is restricted when the first portion 101 and the third bow spring 95 come into contact with each other.

The second portion 102 can restrict movement in the second direction M2 of the second contact portion 82. The movement is restricted when the second portion 102 and the third bow spring 95 come into contact with each other.

Referring to FIG. 3, the third portion 103 can restrict movement in the third direction M3 of the second contact portion 82. The movement is restricted when the third portion 103 and the third bow spring 95 come into contact with each other.

The fourth portion 104 can restrict movement in the fourth direction M4 of the second contact portion 82. The movement is restricted when the fourth portion 104 and the third bow spring 95 come into contact with each other.

The holding wall 100 can be made of an insulating material, however, in the present embodiment, it is made of a metal as a conductor. The holding wall 100 is fixed to the bottom portion 31 of the gear housing 30. Accordingly, the holding wall 100 and the conductive member 51 are electrically connected to each other when they come into contact with each other.

Referring to FIG. 3 and FIG. 5, the conductive member 51 includes a third contact portion 105 that comes into contact with the holding wall 100. The third contact portion 105 is formed on the outer peripheral surface 97 of the third bow spring 95, spaced from the second contact portion 82, and electrically connected to the holding wall 100.

In the present embodiment, the pair of second side plates 54 and 55, the receiving portion 80, the holding wall 100, and the gear housing 30 are formed of a single member integrally.

FIG. 8 is a sectional view showing a state during installation of the conductive member 51 of FIG. 6A into the steering apparatus 1. Referring to FIG. 8, the conductive member 51 can be easily attached to the cylindrical shaft 65 and the receiving portion 80 from, for example, the radially outer side of the steering column 26 in the following manner.

First, the second contact portion 82 of the conductive member 51 is inserted to the inside surrounded by the holding wall 100 assuming a quadrilateral annular shape.

Next, the second bow spring 88 is fitted to the cylindrical shaft 65 from the outer side in the radial direction R1 of the cylindrical shaft 65. Specifically, the conductive member 51 is turned around the second contact portion 82 serving as a pivot. Then, the fourth bow spring 98 is brought into contact with the outer peripheral surface 71 of the cylindrical shaft 65. In this state, by pressing the outer peripheral surface 91 of the second bow spring 88 against the cylindrical shaft 65, the fourth and fifth bow springs 98 and 99 are brought into contact with the outer peripheral surface 71 of the cylindrical shaft 65.

In the state where the fourth and fifth bow springs 98 and 99 are brought into contact with the outer peripheral surface 71 of the cylindrical shaft 65, the outer peripheral surface 91 of the second bow spring 88 is pressed against the cylindrical shaft 65. Accordingly, the fourth bow spring 98 and the fifth bow spring 99 move away from each other along the outer peripheral surface 71 of the cylindrical shaft 65. Along with this, the diameter of the second bow spring 88 is expanded. Further, the first bow spring 83 is resiliently deformed to bend, and the radius of curvature of the curve becomes smaller. As a result, the cylindrical shaft 65 can be smoothly inserted to the inside of the second bow spring 88.

It is also possible that the conductive member 51 is installed by steps different from the above-described steps. For example, it is also possible that after the second bow spring 88 is attached to the cylindrical shaft 65, the third bow spring 95 may be received by the receiving portion 80.

Referring to FIG. 5, in the attached state, according to a resilient restoring force of the second bow spring 88, the inner peripheral surface 90 of the second bow spring 88 constricts the outer peripheral surface 71 of the cylindrical shaft 65 along the outer peripheral surface 71. Along with this, by a resilient restoring force of the first bow spring 83, the first and second contact portions 81 and 82 are pressed against the cylindrical shaft 65 and the receiving portion 80.

In the state where the conductive member 51 is attached, the first contact portion 81 is in contact with the groove bottom of the groove 72 of the outer peripheral surface 71 of the intermediate portion 68 of the cylindrical shaft 65 while pressing the groove bottom. Accordingly, the conductive member 51 and the cylindrical shaft 65 are reliably electrically connected to each other. The first contact portion 81 is restricted from moving in the axial direction X1 of the cylindrical shaft 65 with respect to the cylindrical shaft 65 by the groove 72. Accordingly, the position of the first contact portion 81 is prevented from deviating. Therefore, changes in pressing force due to positional deviation are suppressed, so that electric connection is reliably made.

The second contact portion 82 is always in contact with the receiving portion 80 while pressing it. In this case, the outer peripheral surface of the third bow spring 95 is always in contact with the first portion 101 of the holding wall 100. The first portion 101 receives the second contact portion 82 while restricting movement of the second contact portion 82. Simultaneously, the second contact portion 82 is restricted from moving in the first direction M1 with respect to the steering column 26. In this case, the second to fourth portions 102, 103, and 104 of the holding wall 100 are not in contact with the third bow spring 95. If the third bow spring 95 separates from the first portion 101 due to vibration, etc., of the vehicle, the movement distance in the second, third, and fourth directions M2, M3, and M4 is restricted to be short.

In the present embodiment, in the state where the second bow spring 88 is fitted onto the cylindrical shaft 65 and the second contact portion 82 is in contact with the receiving portion 80, the resilient deformation amount of the first bow spring 83 is in proportion to the distance between the third bow spring 95 and the first portion 101 of the holding wall 100. For example, when the third bow spring 95 is in contact with the first portion 101 of the holding wall 100, the resilient deformation amount of the first bow spring 83 is minimum. As a result, while the second contact portion 82 is pressed against the receiving portion 80, the second contact portion 82 is stably received by the first portion 101 of the holding wall 100.

In the present embodiment, when the conductive member 51, the cylindrical axis 65, and the receiving portion 80 are viewed along the central axis line 106 of the cylindrical shaft 65, the line of action C2 of the reaction force F2 that is applied to the second contact portion 82 by the receiving portion 80 is deviated from the central axis line 106 of the cylindrical shaft 65. Specifically, the reaction force F2 acts in the normal direction of the receiving portion 80 through the second contact portion 82. The line of action C2 of the reaction force F2 is inclined to the steering shaft 3 side with respect to the straight line C3 connecting the central axis line 106 of the cylindrical shaft 65 and the second contact portion 82. As a result, a moment M6 around the cylindrical shaft 65 is generated on the conductive member 51. This moment MG contributes to contact of the conductive member 51 with the receiving portion 80 and the first portion 101 of the holding wall 100.

In the present embodiment, the third bow spring 95 presses the receiving portion 80 and the first portion 101 of the holding wall 100 while being pressed by the first bow spring 93. In this case, the third bow spring 95 is resiliently deformed so that the radius of curvature of the third bow spring 95 becomes smaller. The resilient restoring forces F3 and F4 of the third bow spring 95 act so that the third bow spring 95 is tensioned between the receiving portion 80 and the first portion 101 of the holding wall 100. The resilient restoring forces F3 and F4 contribute to contact of the third bow spring 95 with the receiving portion 80 and the first portion 101 of the holding wall 100.

In the present embodiment, the conductive member 51 is brought into resilient contact with the cylindrical shaft 65 and the receiving portion 80. Even if the shape and dimensions of the conductive member 51 vary, the conductive member 51 can be reliably brought into contact with the cylindrical shaft 65 and the receiving portion 80.

Further, the reliability of connection between the conductive member 51 and the cylindrical shaft 65 can be improved, and as a result, conduction between the steering column 26 and the cylindrical shaft 65 can be reliably made via the conductive member 51. Eventually, the steering column 26 can be reliably grounded to the vehicle body 39, and an electromagnetic interference can be prevented from occurring in the electric power steering apparatus 1.

Referring to FIG. 1, the grounded steering column 26 and the motor housing 32 attached thereto, etc., function as electric shielding. As the result, electromagnetic waves generated outside the steering column 26 and the motor housing 32 can be prevented from harmfully influencing the ECU 22 and the torque sensor 20. Further, radio waves can be prevented from leaking from the steering column 26 and the motor housing 32, so that noise can be prevented from occurring in, for example, a radio receiver (not shown) of the vehicle.

The steering member 2 is provided with a horn switch 112 for sounding a horn 111 (honk). By operating the horn switch 112, the horn 111 can be sounded. In detail, one terminal of the battery 113 provided in the vehicle is grounded to the vehicle body 39. The other terminal of the battery 113 is connected to one terminal of the horn 111. The other terminal of the horn 111 is connected to one contact of the horn switch 112. The other contact of the horn switch 112 is connected to the steering shaft 3. The steering shaft 3 is grounded to the vehicle body 39 in the following manner.

The steering shaft 3, a bearing (not shown) that bears the upper portion of the steering shaft 3, the upper tube 27, the lower tube 28, the sensor housing 29, the gear housing 30, the conductive member 51, the cylindrical shaft 65, and the stationary bracket 37 are formed of conductive members, and are electrically conductive to each other.

The bearing (not shown) that bears the output shaft 18 of the steering shaft 3 is conductive. Thus, the output shaft 18, the bearing, the sensor housing 29, and the gear housing 30 are electrically conductive to each other. The stationary bracket 37 is electrically conductive to the vehicle body 39, and grounded to the vehicle body 39.

Referring to FIG. 3, as described above, the steering apparatus 1 of the present embodiment includes the following components (1) to (10), that is, (1) the stationary bracket 37 fixed to the vehicle body 39, (2) the pair of first side plates 44 and 45 provided on the stationary bracket 37, (3) the first insertion holes 48 formed in the pair of first side plates 44 and 45, (4) the steering column 26 that supports rotatably the steering shaft 3 joined to the steering member 2, (5) the receiving portion 80 and the pair of second side plates 54 and 55 provided on the steering column 26, (6) the second insertion holes 58 formed in the pair of second side plates 54 and 55, (7) the conductive cylindrical shaft 65 inserted through the second insertion holes 58 of the pair of second side plates 54 and 55, (8) the bushings 50 as insulating members interposed between the inner peripheral surfaces of the second insertion holes 58 and the outer peripheral surfaces 69 of the end portions 67 in the axial direction X1 of the cylindrical shaft 65, and (9) the plate-shaped conductive member 51 interposed between the receiving portion 80 and the outer peripheral surface 71 of the intermediate portion 68 in the axial direction X1 of the cylindrical shaft 65.

In the present embodiment, the cylindrical shaft 65 supports the pair of second side plates 54 and 55 via the insulating members. The bolt 66 as a fastening shaft inserted through the first insertion holes 48 of the pair of first side plates 44 and 45 and the cylindrical shaft 65 fasten the pair of first side plates 44 and 45 to the corresponding end faces 70 of the cylindrical shaft 65. The conductive member 51 includes the second bow spring 88 as a gripping portion that resiliently grips the cylindrical shaft 65, and the first bow spring 83 as an energizing portion interposed between the gripping portion and the receiving portion 80. The gripping portion has a U shape that can fit the cylindrical shaft 65 along the radial direction R1 of the cylindrical shaft 65, and by the energizing portion, the first contact portion 81 provided on the gripping portion is resiliently pressed against the outer peripheral surface 71 of the cylindrical shaft 65, and the second contact portion 82 provided on the energizing portion is resiliently pressed against the receiving portion 80.

According to the present embodiment, the first contact portion 81 is in contact with the cylindrical shaft 65 while being resiliently pressed, so that the first contact portion 81 and the cylindrical shaft 65 become reliably electrically conductive to each other. The second contact portion 82 is in contact with the receiving portion 80 while being resiliently pressed, so that the second contact portion 82 and the receiving portion 80 can be made reliably electrically conductive to each other. As a result, the receiving portion 80 provided on the steering column 26 and the cylindrical shaft 65 can be made reliably electrically conductive to each other. Eventually, the stationary bracket 37 and the steering column 26 can be made reliably electrically conductive to each other.

Moreover, the second contact portion 82 can be fitted to the cylindrical shaft 65 from the radial direction R1 of the cylindrical shaft 65, and for example, in a state where the bolt 66 is inserted through the first insertion holes 48 of the pair of first side plates 44 and 45 and the cylindrical shaft 65, the second contact portion 82 can be attached to the cylindrical shaft 65. As a result, troublesome installation of the conductive member 51 can be reduced.

Further, the gripping portion resiliently grips the cylindrical shaft 65, and the energizing portion is interposed in a resiliently compressed state between the outer peripheral surface 71 of the cylindrical shaft 65 and the receiving portion 80. Accordingly, the conductive member 51 can be held between the outer peripheral surface 71 of the cylindrical shaft 65 and the receiving portion 80. Therefore, the conventional attaching member such as the bolt, etc., used for attaching the conventional conductive member can be simplified, and further, the conventional attaching member can be omitted. The conductive member 51 is formed to have a plate shape, so that its structure becomes simple.

In the present embodiment, the energizing portion includes the first bow spring 83 having the first and second end portions 84 and 85. To the first end portion 84 of the first bow spring 83 as the energizing portion, the second bow spring 88 as the gripping portion capable of resiliently constricting the outer peripheral surface 71 of the cylindrical shaft 65 is connected. On the inner peripheral surface 90 of the second bow spring 88, the first contact portion 81 is formed.

In this case, for example, when the first bow spring 83 is resiliently deformed so that the radius of curvature of the curve of the first bow spring 83 becomes smaller, the conductive member 51 can be interposed in a resiliently compressed state between the receiving portion 80 and the cylindrical shaft 65. When the second bow spring 88 is resiliently deformed so that the radius of curvature of the curve of the second bow spring 88 becomes larger, the cylindrical shaft 65 can be resiliently constricted by the second bow spring 88. Accordingly, the second bow spring 88 is reliably held on the cylindrical shaft 65.

In the present embodiment, the first bow spring 83 and the second bow spring 88 have centers of curvature 86 and 89 on the same side. In this case, when the second bow spring 88 is attached to the cylindrical shaft 65 from the radially outer side of the steering column 26, the first bow spring 83 can be prevented from easily interfering with the steering column 26.

In the present embodiment, on the second end portion 85 of the first bow spring 83 as the energizing portion, the third bow spring 95 is provided. The first bow spring 83 and the third bow spring 95 are curved opposite to each other. On the outer peripheral surface 97 of the third bow spring 95, the second contact portion 82 is formed. In this case, by the resilient energizing force of the third bow spring 95, the second contact portion 82 can be reliably brought into contact with the receiving portion 80.

In the present embodiment, on the outer peripheral surface 71 of the cylindrical shaft 65, a groove 72 extending in the circumferential direction T1 of the cylindrical shaft 65 is formed. The second bow spring 88 is fitted in the groove 72 on the outer peripheral surface 71 of the cylindrical shaft 65. By this groove 72, the first contact portion 81 is restricted from moving in the axial direction X1 of the cylindrical shaft 65. In this case, relative movement of the cylindrical shaft 65 and the first contact portion 81 in the axial direction X1 of the cylindrical shaft 65 can be restricted, so that a contact failure can be prevented from occurring between the cylindrical shaft 65 and the first contact portion 81.

In the present embodiment, on the steering column 26, a holding wall 100 as a restricting portion that restricts the second contact portion 82 from moving with respect to the steering column 26 is provided. In this case, relative movement of the receiving portion 80 and the second contact portion 82 can be restricted, so that a contact failure can be prevented from occurring between the receiving portion 80 and the second contact portion 82. Further, the restricting portion and the gripping portion are provided, so that the conductive member 51 can be more reliably held on the receiving portion 80 and the cylindrical shaft 65. As a result, the conventional attaching member can be omitted.

The second contact portion 82 of the present embodiment is received by the receiving portion 80 and the holding wall 100 as a restricting portion. In this case, relative movement of the receiving portion 80 and the second contact portion 82 can be more reliably restricted.

In the present embodiment, the restricting portion includes the holding wall 100 disposed in a quadrilateral annular shape surrounding the receiving portion 80. In this case, when the second contact portion 82 is received in the inside of the quadrilateral annular shape of the holding wall 100, the second contact portion 82 can be reliably brought into contact with the receiving portion 80. Further, the conductive member 51 can be prevented from unexpectedly coming off the receiving portion 80.

In the present embodiment, the steering column 26 includes the gear housing 30 that houses the speed reduction mechanism 24, and this gear housing 30, the receiving portion 80, and the pair of second side plates 54 and 55 are formed from a single material integrally. In this case, the structure of the steering column 26 can be simplified. Further, the mutual positioning accuracy of the receiving portion 80 and the cylindrical shaft 65 can be increased, so that the cylindrical shaft 65 and the receiving portion 80 can be more reliably electrically connected via the conductive member 51.

The following exemplary variations of the present embodiment are possible. In the following description, only differences from the above-described embodiment are shown and described. Other configuration points are the same as in the above-described embodiments.

Figure 9:
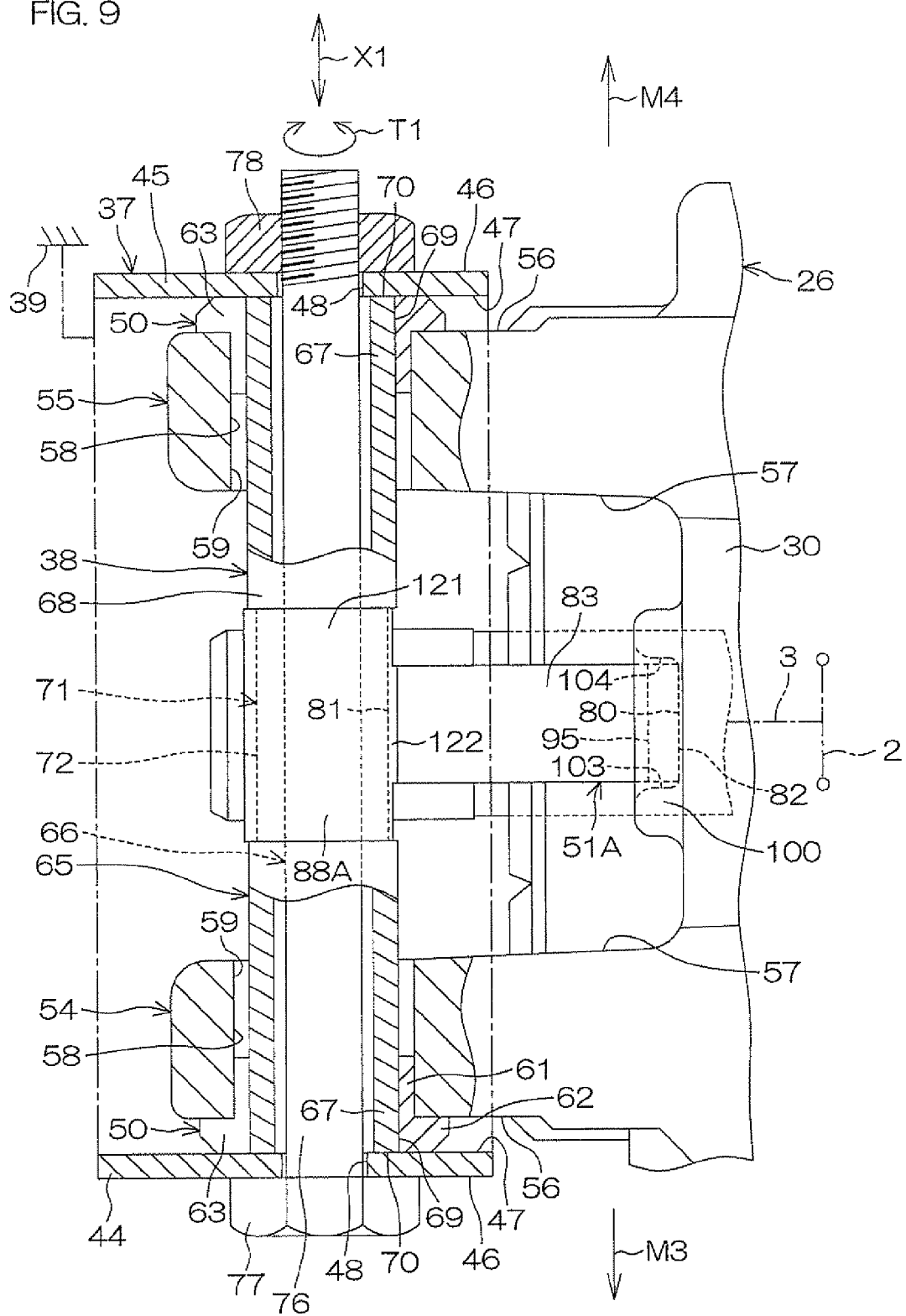
FIG. 9 is a plan view of an essential part of a steering apparatus according to a second embodiment, partially shown in a section.
Figure 10:
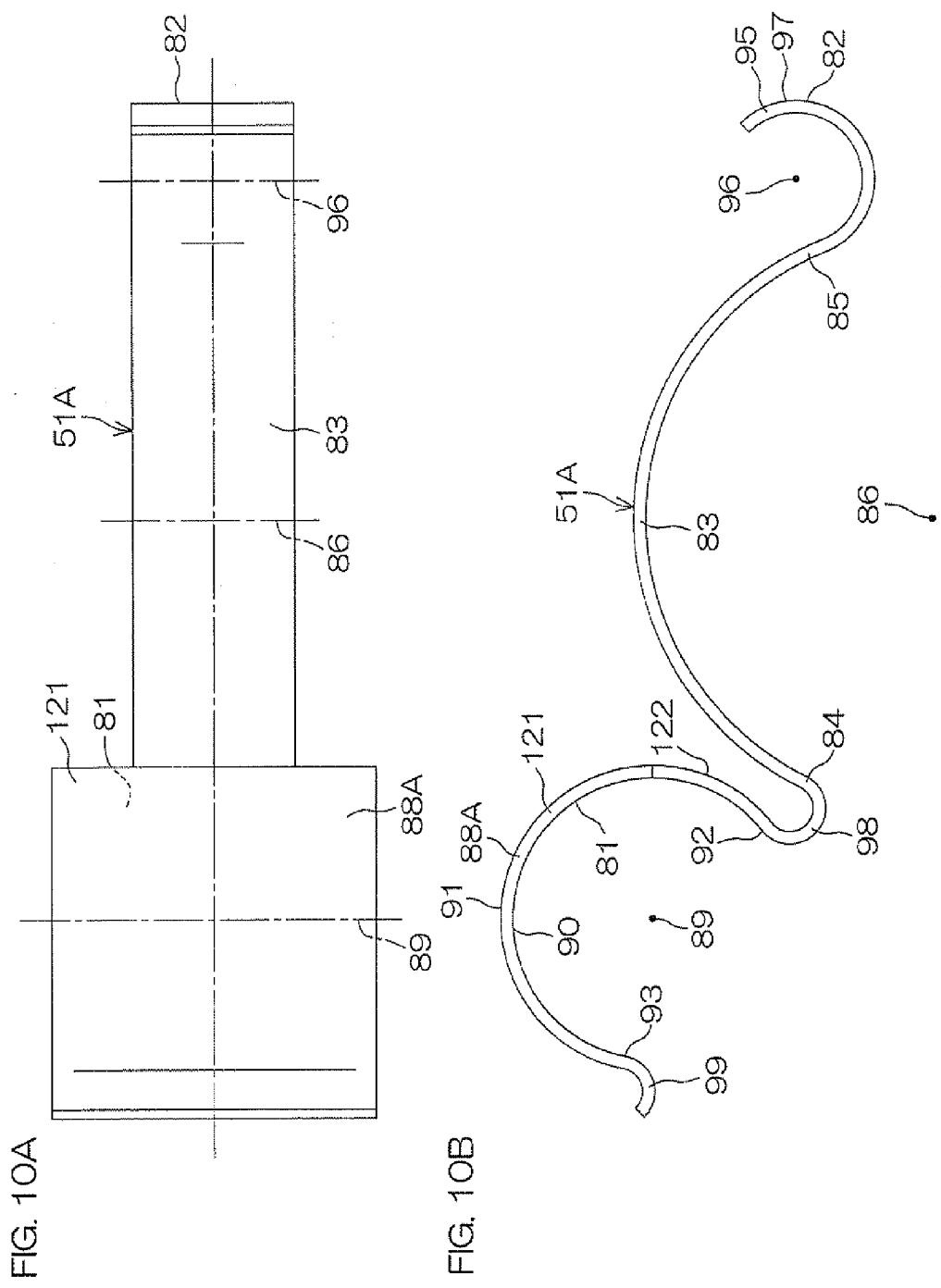
FIG. 10A is a plan view of a conductive member shown in FIG. 9.
FIG. 10B is a side view of the conductive member of FIG. 10A.

For example, FIG. 9 is a plan view of an essential part of a steering apparatus 1 of a second embodiment, partially shown in a section. FIG. 10A is a plan view of a conductive member 51A of FIG. 9, showing a free state. FIG. 10B is a side view of the conductive member 51A of FIG. 10A.

The steering apparatus 1 of the second embodiment includes a conductive member 51A. The conductive member 51A is used instead of the conductive member 51 of the first embodiment. The conductive member 51A is different from the conductive member 51 of the first embodiment in the following point, and other configuration points are the same.

The conductive member 51A includes a second bow spring 88A instead of the second bow spring 88. The second bow spring 88A includes a first portion 121 with a relatively large plate width, and a second portion 122 with a relatively small plate width. The central angle of the first portion 121 in a free state is 180°.

The groove width of the groove 72 of the intermediate portion 68 of the cylindrical shaft 65 is set to be equal to or slightly larger than the plate width of the first portion 121 so that the first portion 121 of the second bow spring 88A of the conductive member 51A can be fitted therein, The second portion 122 is linked to the first bow spring 83 via the fourth bow spring 98. The plate width of the second portion 122 is set to be equal to the plate width of the first bow spring 88.

In the present embodiment, the first contact portion 81 can be formed to be wide, so that it can be reliably electrically connected to the cylindrical shaft 65. Moreover, the plate width of the first bow spring 83 is relatively narrow, so that the first bow spring 83 is easily deformed to bend. As a result, the conductive member 51A is easily attached.

Figure 11:
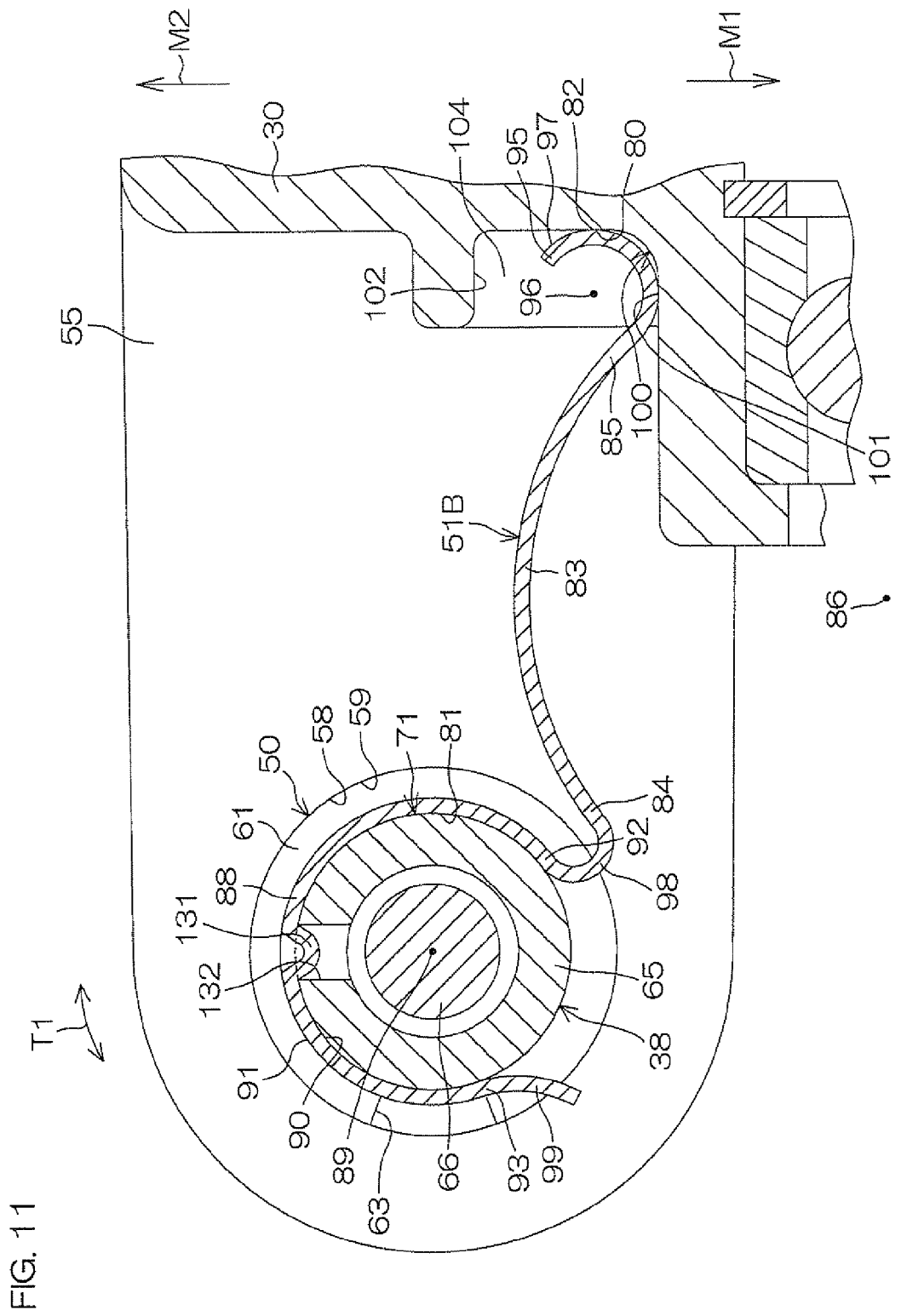
FIG. 11 is an enlarged view showing an essential part of a steering apparatus according to a third embodiment.

FIG. 11 is an enlarged view of an essential part of a steering apparatus 1 of a third embodiment. Referring to FIG. 11, the steering apparatus 1 of the third embodiment includes, instead of the conductive member 51 and the cylindrical shaft 65 of the first embodiment shown in FIG. 3, a conductive member 51B and a cylindrical shaft 65B shown in FIG. 11. The conductive member 51B is different from the conductive member 51 of the first embodiment in the following point, and other points are the same.

The conductive member 51B includes a second bow spring 88B instead of the second bow spring 88. On the inner peripheral surface 90 of the second bow spring 88B, a projection 131 as a restricting portion is formed to project from the inner peripheral surface 90. On the outer peripheral surface 71 of the cylindrical shaft 65, a recess 132 as a restricting portion is formed to face the projection 131. The projection 131 is fitted in the recess 132. Accordingly, the conductive member 51B is restricted from moving in the axial direction X1 (equivalent to the direction vertical to the figure sheet of FIG. 11) and the circumferential direction T1 of the cylindrical shaft 65B with respect to the cylindrical shaft 65B. In this case, the groove 72 of the first embodiment is not formed. The projection 131 may be formed of a plastically deformed portion formed by swaging. The projection 131 and the recess 132 of the third embodiment may be applied to the second embodiment.

Figure 12A:
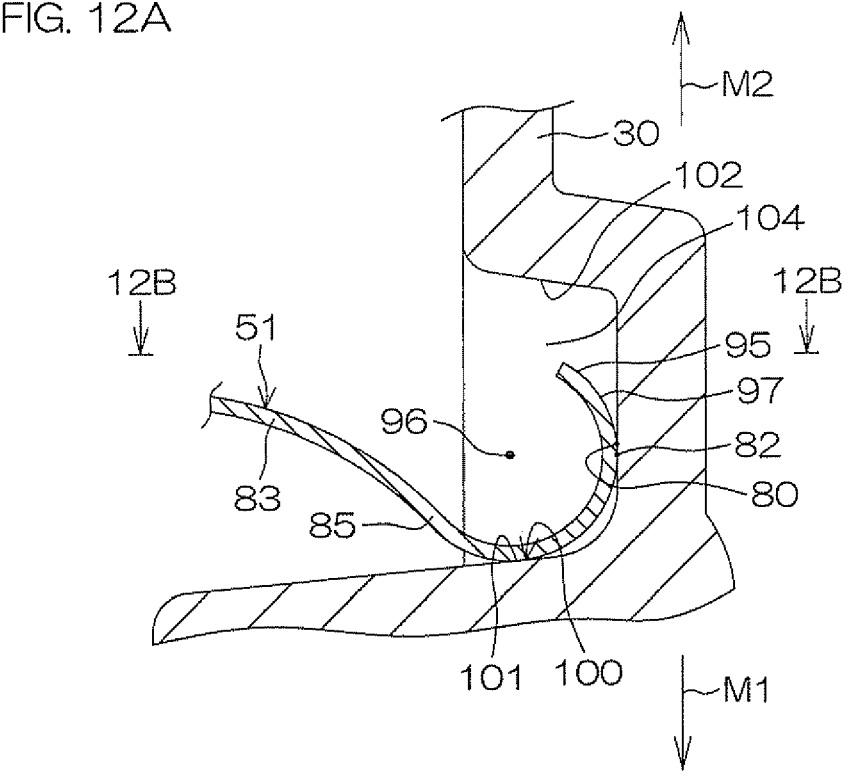
FIG. 12A is a sectional view showing a restricting portion as an essential part of a steering apparatus according to a fourth embodiment.
Figure 12B:
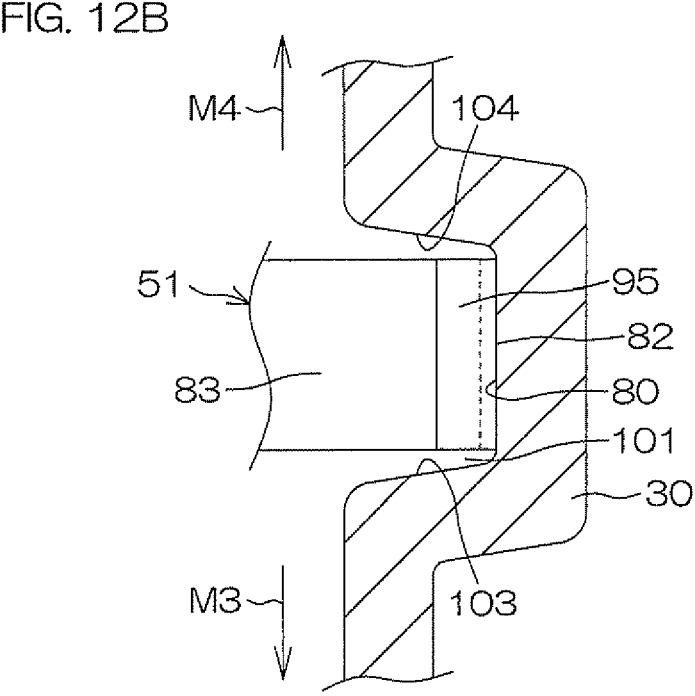
FIG. 12B is a sectional view along 12B-12B of FIG. 12A.
Figure 13:
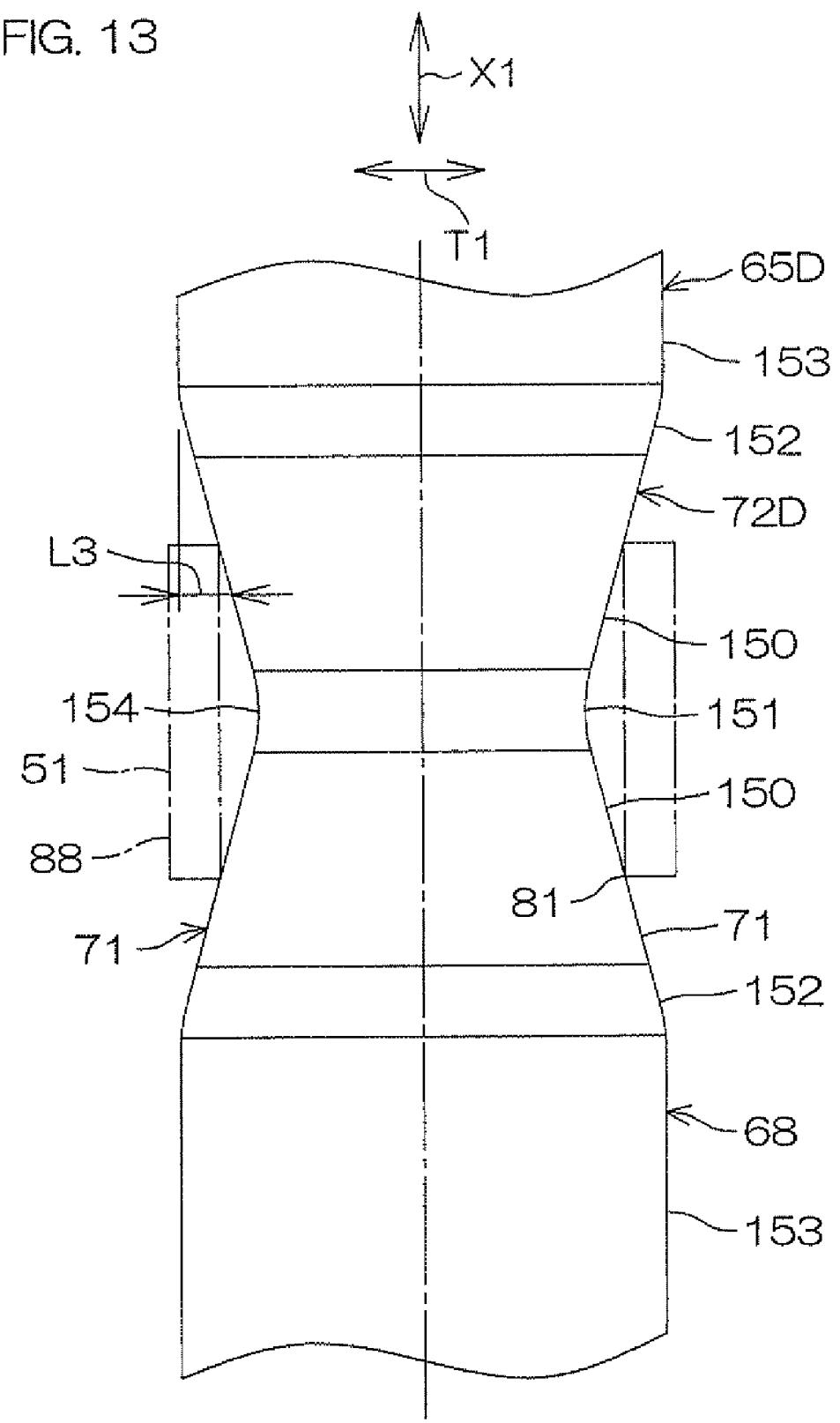
FIG. 13 is a plan view showing a cylindrical shaft as an essential part of a steering apparatus according to a fifth embodiment.

FIG. 12A is a sectional view showing a holding wall 100 as an essential part of a steering apparatus 1 of a fourth embodiment. FIG. 12B is a sectional view in a section along 12B-12B of FIG. 12A. The present embodiment shows an exemplary variation of the holding wall 100, and other components are the same as in the first embodiment. The holding wall 100 of the present embodiment is formed on the side wall of a recess provided on the steering column. In detail, first to fourth portions 101, 102, 103, and 104 of the holding wall 100 form a side wall of the recess formed on the bottom portion 31 of the gear housing 30. On the bottom of this recess, a receiving portion 80 is provided. The holding wall 100 of the present embodiment is applicable to the above-described embodiments. FIG. 13 is a plan view showing a cylindrical shaft 65D as an essential part of a steering apparatus 1 of a fifth embodiment. The steering apparatus 1 of the present embodiment includes, instead of the cylindrical shaft 65 of the first embodiment of FIG. 3, a cylindrical shaft 65D shown in FIG. 13. The cylindrical shaft 65D is different from the cylindrical shaft 65 in the following point, and other points are the same.

The outer peripheral surface 71 of the intermediate portion 68 of the cylindrical shaft 65D has a groove 72D. The groove 72D extends endlessly in the circumferential direction T1 of the cylindrical shaft 65D. The groove 72D has a pair of inclined surfaces 150 and a groove bottom portion 151 connecting the pair of inclined surfaces 150 in a section (axial section) including the central axis line of the cylindrical shaft 65D.

The pair of inclined surfaces 150 are inclined with respect to the axial direction X1 of the cylindrical shaft 65D opposite to each other in the axial direction X1 of the cylindrical shaft 65D. The angle between the pair of inclined surfaces 150 is obtuse in an axial section. Each inclined surface 150 forms a part of a conical surface. The small-diameter side end portions of the pair of inclined surfaces 150 are close to each other.

The groove bottom portion 151 is provided at the central portion 154 of the groove 72D in the axial direction X1 of the cylindrical shaft 65D. The groove bottom portion 151 is formed of a recessed curved surface, and smoothly connects the small-diameter side end portions of the pair of inclined surfaces 150. The groove bottom portion 151 has a recessed curved shape, that is, for example, an arc shape in an axial section.

The large-diameter side end portions of the inclined surfaces 150 are smoothly connected to the cylindrical surface 153 of the outer peripheral surface 71 of the intermediate portion 68 of the cylindrical shaft 65D via projecting curved edge portions 152. The edge portions 152 have projecting curved shapes, that is, for example, arc shapes in an axial section.

In the axial direction X1 of the cylindrical shaft 65D, the groove width of the groove 72D (dimension between the large-diameter side end portions of the pair of inclined surfaces 150 in the axial direction X1) are set to be larger than the width of the second bow spring 88 of the conductive member 51. Accordingly, the pair of inclined surfaces 150 of the groove 72D can come into contact with the second bow spring 88 of the conductive member 51. As a result, the conductive member 51 can be restricted from moving in the axial direction X1.

Due to the pair of inclined surfaces 150, sectional shapes at and near the groove 72D of the intermediate portion 68 of the cylindrical shaft 65D change smooth. Therefore, as a method for machining the groove 72D, plastic forming, for example, forging can be used. By using plastic forming, the manufacturing cost can be reduced. When the entire cylindrical shaft 65D is formed by plastic forming, for example, forging, post-processing, for example, cutting of the groove 72D becomes unnecessary. Therefore, the manufacturing cost can be further reduced.

Meanwhile, the groove 72D of the cylindrical shaft 65D may be formed to have ends in the circumferential direction T1 of the cylindrical shaft, 65D. In this case, the groove 72D is disposed in the circumferential direction T1 so that the groove 72D and the first contact portion 81 of the conductive member 51 come into contact with each other. The groove 72D that is formed with the ends can also be formed by plastic forming as in the case of the endless groove 72D, and the manufacturing cost can be reduced. The above-described groove 72D can be applied to the above-described second to fourth embodiments regardless of whether or not the groove is endless.

Thus, in the present embodiment, the depth L3 of the groove 72D is made gradually deeper toward the central portion 154 of the groove 72D in the axial direction X1 of the cylindrical shaft 65D. In this case, the groove 72D can be easily formed by plastic forming. As a result, the manufacturing cost can be further reduced. For example, in an axial section of the groove 72D, the groove bottom portion 151 provided at the central portion 154 has a recessed curved shape, and the pair of edge portions 152 of the groove 72D have projecting curved shapes. This case is preferable for forming the groove 72D by forging.

In the embodiments described above, it is also possible that the second to fourth portions 102, 103, and 104 of the holding wall 100 may be normally in contact with the third bow spring 95. In this case, relative movement of the third bow spring 95 and the receiving portion 80 can be reliably restricted, so that a contact failure can be more reliably prevented from occurring between the second contact portion 82 and the receiving portion 80.

In the embodiments described above, the holding wall 100 as a restricting portion is required to have at least the first portion 101. The restricting portion may be a projection (not shown) fixed to the steering column 3. By contact of the conductive member 51 with this projection, relative movement of the conductive member 51 and the receiving portion 80 can be restricted. On the contrary, it is also possible that the holding wall 100 is omitted.

It is also possible that the groove 72 or 72D of the cylindrical shaft 65 is omitted.

It is also possible that at least a part of at least one of the second side plates 54 and 55, the receiving portion 80, and the holding wall 100 is formed separately from the steering column 26 and fixed to the steering column 26. For example, the restricting portion may be a projection attached to the gear housing 30. The receiving portion 80 may be a conductor attached in a conductible manner to the gear housing 30. The pair of second side plates 54 and 55 may be attached in a fixed manner to the steering column 26.

As an energizing portion, a leaf spring that is flat in a free state can also be used in a curved state.

The conductive members 51, 51A, and 51B are also applicable to a steering apparatus (not shown) the tilt of which is not adjustable, as well as the above-described steering apparatus 1 the tilt of which is adjustable.

The present invention can be variously changed within the scope of matters described in claims.

DESCRIPTION OF REFERENCE NUMERALS

1: Steering apparatus, 2: Steering member, 3: Steering shaft, 26: Steering column, 31: Bottom portion of gear housing, 37: Stationary bracket, 39: Vehicle body, 44, 45: First side plate, 48: First insertion hole, 50: Bushing (insulating member), 51, 51A, 51B: Conductive member, 54, 55: Second side plate, 58: Second insertion hole, 59: Inner peripheral surface (of second insertion hole), 65, 65B, 65D: Cylindrical shaft, 66: Bolt (fastening shaft), 67: End portion (in axial direction of cylindrical shaft), 69: Outer peripheral surface (of end portion in axial direction of cylindrical shaft), 68: Intermediate portion (in axial direction of cylindrical shaft), 70: End face of cylindrical shaft, 71: Outer peripheral surface (of intermediate portion in axial direction of cylindrical shaft), 72, 72D: Groove, 80: Receiving portion, 81: First contact portion, 82: Second contact portion, 83: First bow spring (energizing portion), 84: First end portion (of first bow spring), 85: Second end portion (of first bow spring), 86: Center of curvature of first bow spring, 88, 88A, 88B: Second bow spring (gripping portion), 89: Center of curvature of second bow spring, 90: Inner peripheral surface (of second bow spring), 95: Third bow spring, 97: Outer peripheral surface (of third bow spring), 100: Holding wall (restricting portion), 154: Central portion of groove, L3: Depth of groove, R1: Radial direction (of cylindrical shaft), T1: Circumferential direction (of cylindrical shaft), X1: Axial direction of cylindrical shaft

What is claimed is:

1. A steering apparatus comprising:
a pair of first side plates provided on a stationary bracket fixed to a vehicle body;
first insertion holes formes in the pair of first side plates, respectively;
a steering column that supports rotatably a steering shaft joined to a steering member;
a receiving portion that is provided on the steering column for receiving one end of a conductive member;
a pair of second side plates provided on both sides of the receiving portion of the steering column;
second insertion holes formed in the pair of second side plates, respectively;
a conductive cylindrical shaft inserted through the second insertion holes;
a fastening shaft that is inserted through the first insertion holes and the cylindrical shaft and fastens the first side plates to the end face sides of the cylindrical shaft; and
a plate-shaped conductive member interposed between the receiving portion and an outer peripheral surface of the cylindrical shaft, wherein the conductive member includes a first contact portion that comes into contact with the outer peripheral surface of the cylindrical shaft, a second contact portion provided on the side opposite to the first contact portion, and an energizing portion interposed between the first contact portion and the second contact portion,
the first contact portion has a U shape that can fit the cylindrical shaft,
the energizing portion resiliently presses the first contact portion against the outer peripheral surface of the cylindrical shaft, and
the second contact portion resiliently presses the receiving portion.

2. The steering apparatus according to claim 1, wherein the conductive member includes a first bow spring forming the energizing portion and a second bow spring that is connected to the first bow spring and forms the first contact portion, and
the first contact portion that comes into contact with the outer peripheral surface of the cylindrical shaft is formed on the inner peripheral surface of the second bow spring.

3. The steering apparatus according to claim 2, wherein the first bow spring and the second bow spring have centers of curvature on the same side.

4. The steering apparatus according to claim 2, wherein on the outer peripheral surface of the cylindrical shaft, a groove extending along at least a part of the circumferential direction of the cylindrical shaft is formed,
the second bow spring is fitted in the groove, and
the second bow spring is restricted from moving in the axial direction of the cylindrical shaft by the groove.

5. The steering apparatus according to claim 4, wherein the depth of the groove is gradually increased toward the central portion of the groove in the axial direction of the cylindrical shaft.

6. The steering apparatus according to claim 2, wherein a third bow spring forming a second contact portion is connected to an end portion of the first bow spring at an opposite side to the second bow spring, and
the second contact portion is formed on the outer peripheral surface of the third bow spring.

7. The steering apparatus according to claim 6, wherein the first bow spring and the third bow spring are curved opposite to each other.

8. The steering apparatus according to claim 1, wherein the steering column is provided with a restricting portion that restricts the second contact portion from moving with respect to the steering column.

9. The steering apparatus according to claim 8, wherein the second contact portion is received by the receiving portion and the restricting portion.

10. The steering apparatus according to claim 1, further comprising: insulating members interposed between the inner peripheral surfaces of the second insertion holes and the outer peripheral surfaces of the end portions in the axial direction of the cylindrical shaft, wherein the cylindrical shaft supports the pair of second side plates via the insulating members.

* * * * *